(12) United States Patent
Ettus et al.

(10) Patent No.: US 11,848,747 B1
(45) Date of Patent: Dec. 19, 2023

(54) MULTIPLE USER ACCESS CHANNEL

(71) Applicant: Apple Inc., Cupertino, CA (US)

(72) Inventors: Matthew N. Ettus, Monte Sereno, CA (US); Shahram Talakoub, San Jose, CA (US); Ian Buckley, Bend, OR (US); Sebastian B. Seeber, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/483,451

(22) Filed: Sep. 23, 2021

Related U.S. Application Data

(60) Provisional application No. 63/197,232, filed on Jun. 4, 2021.

(51) Int. Cl.
  *H04W 72/02* (2009.01)
  *H04B 7/185* (2006.01)
  *H04W 72/044* (2023.01)
  *H04W 72/51* (2023.01)

(52) U.S. Cl.
  CPC ........ *H04B 7/18582* (2013.01); *H04W 72/02* (2013.01); *H04W 72/044* (2013.01); *H04W 72/51* (2023.01)

(58) Field of Classification Search
  None
  See application file for complete search history.

(56) References Cited

U.S. PATENT DOCUMENTS

| | | | |
|---|---|---|---|
| 7,149,533 B2 | 12/2006 | Laird et al. | |
| 7,466,986 B2 | 12/2008 | Halcrow et al. | |
| 7,532,898 B2 | 5/2009 | Halcrow et al. | |
| 8,103,445 B2 | 1/2012 | Smith et al. | |
| 8,665,847 B2 | 3/2014 | Holostov et al. | |
| 8,930,458 B2 | 1/2015 | Lewis | |
| 10,547,374 B1 * | 1/2020 | Liu | H04W 72/14 |
| 10,791,010 B1 * | 9/2020 | Murphy | H04B 7/0456 |
| 2002/0191810 A1 * | 12/2002 | Fudge | G06T 1/0085 |
| | | | 382/250 |

(Continued)

FOREIGN PATENT DOCUMENTS

WO  WO-2021168702 A1 *  9/2021

OTHER PUBLICATIONS

U.S. Appl. No. 16/945,133, filed Jul. 31, 2020.

*Primary Examiner* — Kodzovi Acolatse
(74) *Attorney, Agent, or Firm* — Treyz Law Group, P.C.; Michael H. Lyons

(57) ABSTRACT

A communications system may include a satellite and user equipment (UE) devices. When the UE devices have uplink (UL) packets to transmit, each UE device may randomly select a time slot within a finite time window associated with a time reference of the satellite. The UE device may identify a path length between itself and the satellite and may generate a timing advance based on the path length, the time reference, and the time slot. The satellite may begin to receive the UL packets within the time window and may search received signals over the time window to identify the UL packets. The satellite may recover data payloads from the identified UL packets and may pass the recovered data payloads up a protocol stack. By limiting the search to the time window, the satellite may correctly distinguish the UL packets while using a minimal amount of processing resources.

20 Claims, 10 Drawing Sheets

(56) References Cited

U.S. PATENT DOCUMENTS

| | | | |
|---|---|---|---|
| 2006/0013185 A1* | 1/2006 | Seo | H04W 36/30 |
| | | | 370/208 |
| 2009/0005061 A1 | 1/2009 | Ward et al. | |
| 2014/0177550 A1* | 6/2014 | Liao | H04W 28/18 |
| | | | 370/329 |
| 2018/0241464 A1* | 8/2018 | Michaels | H04W 56/0045 |
| 2018/0254825 A1* | 9/2018 | Speidel | H04W 56/0045 |
| 2019/0297506 A1 | 9/2019 | Shoshan et al. | |
| 2019/0342147 A1 | 11/2019 | O'Reirdan et al. | |
| 2021/0273719 A1* | 9/2021 | Wang | H04B 7/18519 |
| 2022/0132593 A1* | 4/2022 | Ren | H04W 72/0446 |

\* cited by examiner

MULTIPLE USER ACCESS CHANNEL

This application claims the benefit of U.S. Provisional Patent Application No. 63/197,232, filed Jun. 4, 2021, which is hereby incorporated by reference herein in its entirety.

FIELD

This relates generally to wireless communications, including wireless communications between user equipment via one or more satellites.

BACKGROUND

Communications systems are used to convey data between user equipment. Many communications systems include satellites that wirelessly convey data between terrestrial-based user equipment and terrestrial-based gateways. Each satellite provides wireless network access to user equipment devices located within a corresponding coverage area on Earth.

Satellites are located in space and possess finite resources for handling communications with user equipment devices in their coverage areas. In addition, user equipment devices on Earth generally have limited output power levels that can make it difficult for satellites or gateways to distinguish uplink signals transmitted by the user equipment devices from other signals.

SUMMARY

A communications system may include a satellite, multiple user equipment (UE) devices in a coverage area of the satellite, a gateway, and a terrestrial network. The satellite may convey wireless data between the UE devices and the terrestrial network via the gateway. The UE devices may include uplink (UL) data packets in UL signals transmitted to the satellite for a reverse link. The satellite may forward data from the UL data packets to the gateway. The gateway may provide the data to the terrestrial network to forward the data to a desired destination.

The satellite may provide a downlink (DL) beacon to the UE devices in its coverage area. The DL beacon may identify a time reference of the satellite. When the UE devices have UL data packets to transmit, each UE device may randomly select a time slot and channel within a narrow time window associated with the time reference. The UE device may identify a path length between itself and the satellite based on the location of the UE device and the location of the satellite as identified by a satellite positioning almanac on the UE device. The UE device may generate a timing advance based on the identified path length, the time reference, and the selected time slot. The timing advance may correspond to a time delay required before transmission so the UL data packet transmitted by the UE device arrives at the satellite within the selected time slot of the narrow time window after traversing the identified path length. The UE device may generate the UL data packet using spectrum spreading techniques if desired. The UE may then transmit the UL data packet according to the generated timing advance.

The satellite may receive radio-frequency signals during the finite time window. The satellite may begin to receive the time-advanced UL data packets transmitted by the UE devices within time slots of the finite time window. The finite time window may be around 5 ms, as an example. The satellite may pass the signals to a gateway that searches the received radio-frequency signals over frequency and over the finite time window to identify the UL data packets transmitted by the UE devices. If desired, the gateway may reverse the spectrum spreading performed by the UE devices. The gateway may recover the data payload from the identified UL data packets and may pass the recovered data payload up a protocol stack. By limiting the reverse link signal search to the finite time window rather than searching over all time, the gateway may correctly identify all of the UL data packets transmitted by the UE devices in its coverage area while utilizing a minimal amount of processing resources.

DETAILED DESCRIPTION

Figure 1:
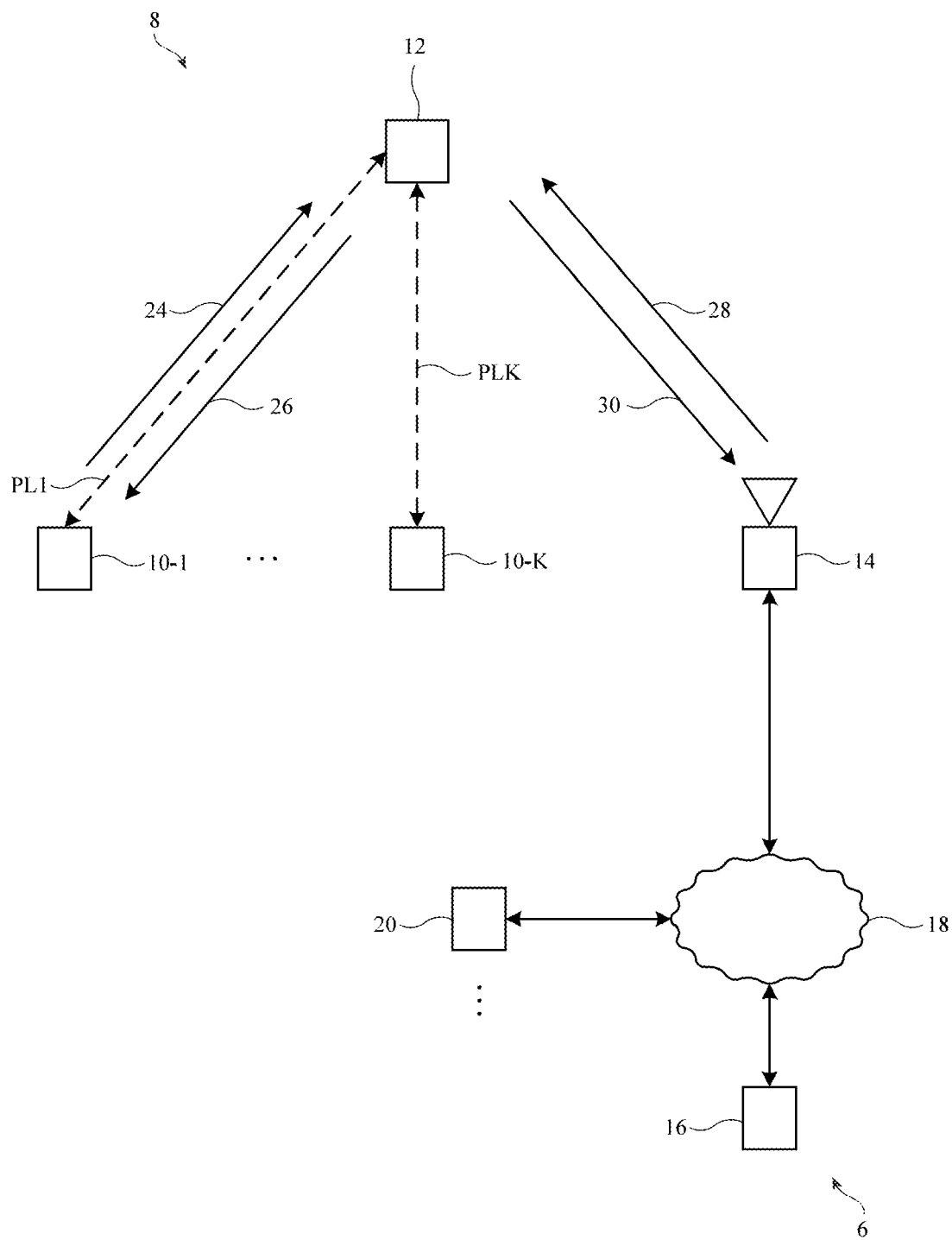
FIG. 1 is a diagram of an illustrative communications system that includes a communications satellite for conveying radio-frequency signals from user equipment devices to a terrestrial gateway in accordance with some embodiments.

FIG. 1 is a diagram of an illustrative communications system 8. Communications system 8 (sometimes referred to herein as communications network 8, network 8, satellite communications system 8, or satellite communications network 8) may include a ground-based (terrestrial) gateway system that includes one or more gateways 14, one or more user equipment (UE) devices 10 (e.g., a first UE device 10-1, a Kth UE device 10-K, etc.), and a terrestrial network 6 on Earth. Terrestrial network 6 may include terrestrial network UE devices 20, one or more network operations centers such as network operations center (NOC) 16, and network portion 18. Communications system 8 may also include one or more communications satellites 12 in space (e.g., in orbit above Earth). While communications system 8 may include any desired number of satellites 12 and any desired number of gateways 14, only a single satellite 12 and a single gateway 14 are illustrated in FIG. 1 for the sake of clarity. Each gateway in communications system 8 may be located at a different respective geographic location on Earth (e.g., in different regions, states, countries, continents, etc.).

Network portion 18 may communicably couple NOC 16 and terrestrial network UE devices 20 to gateway 14. Gateway 14 may include a satellite network ground station and may therefore sometimes also be referred to as ground station 14 or satellite network ground station 14. Gateway 14 may include one or more antennas, modems, transceivers, beam forming circuitry, control circuitry, etc. The components of gateway 14 may, for example, be disposed at the same geographic location (e.g., within the same computer, server, data center, building, etc.). Gateway 14 may convey communications data between terrestrial network 6 and one or more UE devices 10 via satellite 12.

Network portion 18 may include any desired number of network nodes, terminals, and/or end hosts that are communicably coupled together using communications paths that include wired and/or wireless links. The wired links may include cables (e.g., ethernet cables, optical fibers or other optical cables that convey signals using light, telephone cables, etc.). Network portion 18 may include one or more relay networks, mesh networks, local area networks (LANs), wireless local area networks (WLANs), ring networks (e.g., optical rings), cloud networks, virtual/logical networks, the Internet, combinations of these, and/or any other desired network nodes coupled together using any desired network topologies (e.g., on Earth). The network nodes, terminals, and/or end hosts may include network switches, network routers, optical add-drop multiplexers, other multiplexers, repeaters, modems, servers, network cards, wireless access points, wireless base stations, UE devices such as terrestrial network UE devices 20, UE devices such as UE devices 10, and/or any other desired network components. The network nodes in network portion 18 may each include physical components such as electronic devices, servers, computers, user equipment, etc., and/or may include virtual components that are logically defined in software and that are distributed across two or more underlying physical devices (e.g., in a cloud network configuration).

NOC 16 may control the operation of gateway 14 in communicating with the satellites in communications system 8. NOC 16 may also control the operation of the satellites in communications system 8. For example, NOC 16 may convey control commands via gateway 14 that controls the communications operations, positioning operations, and/or any other desired operations performed in space by satellite 12. NOC 16, the gateways in communications system 8, and/or the satellites in communications system 8 may be operated or managed by a corresponding network carrier or service provider. If desired, a first service provider may control the operation of the satellites and/or gateways in communications system 8 whereas a second network carrier or service provider controls or manages communications between UE devices 10 and terrestrial network UE devices 20 via satellite 12 and gateway 14.

The satellites in communications system 8 may sometimes be referred to collectively herein as a constellation of satellites. Gateway 14 may, for example, control the operations of the constellation of satellites over corresponding radio-frequency communications links. An example in which the constellation of satellites in communications system 8 includes only a single satellite 12 is described herein as an example for the sake of clarity. However, in practice, the satellite constellation in communications system 8 may include any desired number of satellites (e.g., two satellites, four satellites, ten satellites, dozens of satellites, hundreds of satellites, thousands of satellites, etc.). If desired, two or more of the satellites may convey radio-frequency signals between each other using satellite-to-satellite (e.g., relay) links. The operations of a single satellite 12 as described herein may, if desired, be performed by multiple satellites in communications system 8 (e.g., using satellite-to-satellite links).

Satellite 12 may be a low earth orbit (LEO) satellite at an orbital altitude of less than around 8,000 km (e.g., a satellite in a low earth orbit, an inclined low earth orbit, a low earth circular orbit, etc.), a geosynchronous satellite at an orbital altitude of greater than around 30,000 km (e.g., a satellite in a geosynchronous orbit), a medium earth orbit (MEO) satellite at an orbital altitude between around 8,000 km and 30,000 km (e.g., a satellite in a medium earth orbit), a sun synchronous satellite (e.g., a satellite in a sun synchronous orbit), a satellite in a tundra orbit, a satellite in a Molniya orbit, a satellite in a polar orbit, or a satellite in any other desired orbit around Earth. Communications system 8 may include satellites in any desired combination of orbits or orbit types.

Satellite 12 may communicate with one or more UE devices 10 on Earth using one or more radio-frequency communications links (e.g., satellite-to-user equipment links). Satellite 12 may also communicate with gateway 14 on Earth using a radio-frequency communications link (e.g., a satellite-to-gateway link). Radio-frequency signals may be conveyed between UE devices 10 and satellite 12 and between satellite 12 and gateway 14 in IEEE bands such as the IEEE C band (4-8 GHz), S band (2-4 GHz), L band (1-2 GHz), X band (8-12 GHz), W band (75-110 GHz), V band (40-75 GHz), K band (18-27 GHz), $K_a$ band (26.5-40 GHz), $K_u$ band (12-18 GHz), and/or any other desired satellite communications bands. If desired, different bands may be used for the satellite-to-user equipment links than for the satellite-to-gateway links.

Communications may be performed between gateway 14 and UE devices 10 in a forward link direction and/or in a reverse link direction. In the forward link direction (sometimes referred to simply as the forward link), wireless data is conveyed from gateway 14 to UE device(s) 10 via satellite 12. For example, gateway 14 may transmit the wireless data to satellite 12 in radio-frequency signals 28 and satellite 12 may transmit the wireless data received from gateway 14 to UE device(s) 10 in radio-frequency signals 26. Radio-frequency signals 28 are conveyed in an uplink direction from gateway 14 to satellite 12 and may therefore sometimes be referred to herein as uplink (UL) signals 28, forward link UL signals 28, or forward link signals 28. Radio-frequency signals 26 are conveyed in a downlink direction from satellite 12 to UE device(s) 10 and may therefore sometimes be referred to herein as downlink (DL) signals 26, forward link DL signals 26, or forward link signals 26.

In the reverse link direction (sometimes referred to simply as the reverse link), wireless data is conveyed from UE device(s) 10 to gateway 14 via satellite 12. For example, UE device(s) 10 may transmit wireless data to satellite 12 in radio-frequency signals 24 and satellite 12 may transmit the wireless data received from UE device(s) 10 to gateway 14 in radio-frequency signals 30. Radio-frequency signals 24 are conveyed in an uplink direction from UE device(s) 10 to satellite 12 and may therefore sometimes be referred to herein as uplink (UL) signals 24, reverse link UL signals 24, or reverse link signals 24. Radio-frequency signals 30 are conveyed in a downlink direction from satellite 12 to gateway 14 and may therefore sometimes be referred to herein as downlink (DL) signals 30, reverse link DL signals 30, or reverse link signals 30. Gateway 14 may forward wireless data between UE device(s) 10 and terrestrial network UE device(s) 20.

UE devices 10 may communicate with other UE devices 10 and/or with terrestrial network UE devices 20 via satellite 12. If desired, UE devices 10 may also convey radio-frequency signals with terrestrial base stations and/or access points (e.g., with terrestrial network base stations and/or access points in network portion 18) via terrestrial network wireless communications links when available. In some implementations, UE devices 10 communicate with terrestrial network UE devices 20 via terrestrial network wireless communications links when the UE devices 10 are within range of a terrestrial network base station or access point and are able to establish a communications link with the terrestrial network base station or access point, whereas UE devices 10 communicate with terrestrial network UE devices 20 via satellite 12 and gateway 14 when the terrestrial network wireless communications links are unavailable (e.g., due to a service outage by the terrestrial network or due to the UE devices 10 being out of range of any terrestrial network base station or access point). If desired, UE devices 10 may include separate antennas for handling communications over the satellite-to-user equipment link and one or more terrestrial network wireless communications links or UE devices 10 may include a single antenna that handles both the satellite-to-user equipment link and the terrestrial network wireless communications links. The terrestrial network wireless communications links may be, for example, cellular telephone links (e.g., links maintained using a cellular telephone communications protocol such as a 4G Long Term Evolution (LTE) protocol, a 3G protocol, a 3GPP Fifth Generation (5G) New Radio (NR) protocol, etc.), wireless local area network links (e.g., Wi-Fi® and/or Bluetooth links), etc.

The wireless data conveyed in DL signals 26 may sometimes be referred to herein as DL data, forward link DL data, or forward link data. UL signals 28 may also convey the forward link data. The wireless data conveyed in UL signals 24 may sometimes be referred to herein as UL data, reverse link UL data, or reverse link data. DL signals 30 may also convey the reverse link data. The forward link data may be generated by a terrestrial UE device 20 and may be conveyed to satellite 12 using gateway 14 and network portion 18, for example. Similarly, the reverse link data may be conveyed to a terrestrial UE device 20 using gateway 14 and network portion 18. The forward link data and the reverse link data may include text data such as email messages, text messages, an emergency or SOS message, a location message identifying the location of UE device(s) 10, or other text-based data, audio data such as voice data (e.g., for a bi-directional satellite voice call) or other audio data (e.g., streaming satellite radio data), video data (e.g., for a bi-directional satellite video call or to stream video data transmitted by gateway 14 at UE device(s) 10), cloud network synchronization data, data generated or used by software applications running on UE device(s) 10 and/or terrestrial network UE device(s) 20, and/or any other desired data. UE devices 10 may only receive forward link data, may only transmit reverse link data, or may both transmit reverse link data and receive forward link data.

Figure 2:
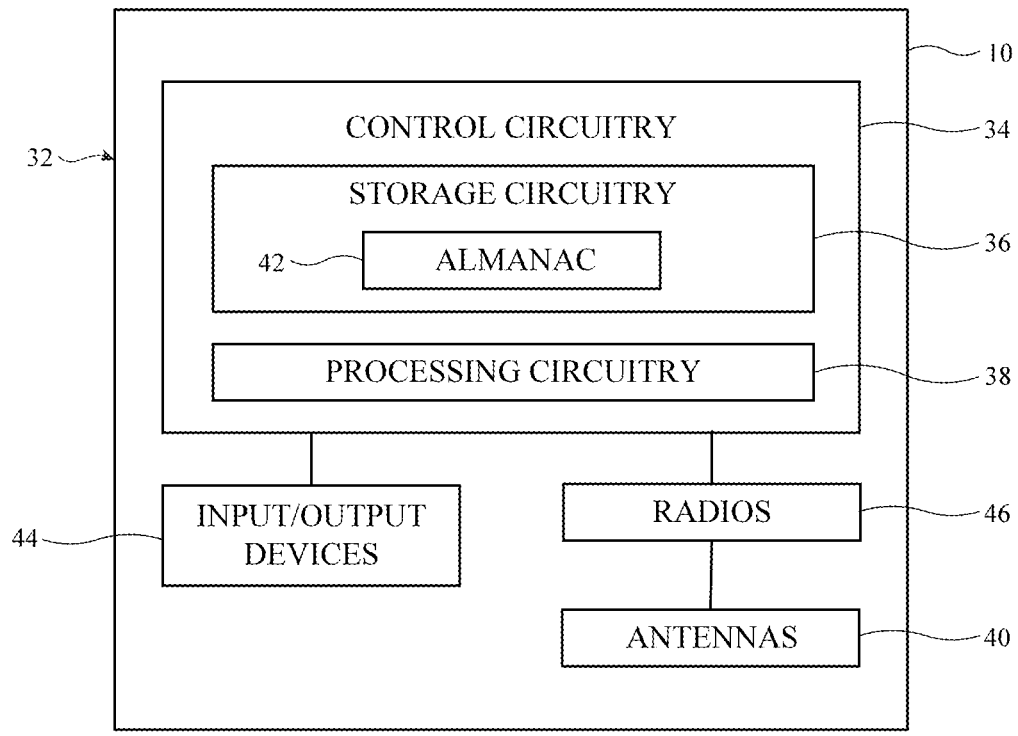
FIG. 2 is a schematic diagram of an illustrative user equipment device in accordance with some embodiments.

Satellite 12 may communicate with the UE devices 10 located within its coverage area (e.g., the K UE devices 10 located within a region or area on Earth that overlaps the signal beam(s) producible by satellite 12). The K UE devices 10 may transmit reverse link data to satellite 12 to be forwarded to terrestrial network UE devices 20 or other portions of terrestrial network 6. In practice, K may be any number (e.g., one, two, ten, dozens, hundreds, thousands, etc.). FIG. 2 is a diagram of an illustrative UE device 10 (e.g., one of the K UE devices 10 in the coverage area of satellite 12).

UE device 10 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in FIG. 2, UE device 10 may include components located on or within an electronic device housing such as housing 32. Housing 32, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 32 may be formed from dielectric or other low-conductivity material (e.g., glass, ceramic, plastic, sapphire, etc.). In other situations, housing 32 or at least some of the structures that make up housing 32 may be formed from metal elements.

UE device 10 may include control circuitry 34. Control circuitry 34 may include storage such as storage circuitry 36. Storage circuitry 36 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 36 may include storage that is integrated within UE device 10 and/or removable storage media.

Control circuitry 34 may include processing circuitry such as processing circuitry 38. Processing circuitry 38 may be used to control the operation of UE device 10. Processing circuitry 38 may include on one or more processors, microprocessors, microcontrollers, digital signal processors, host processors, baseband processor integrated circuits, application specific integrated circuits, central processing units (CPUs), graphics processing units (GPUs), etc. Control circuitry 34 may be configured to perform operations in device 10 using hardware (e.g., dedicated hardware or circuitry), firmware, and/or software. Software code for performing operations on UE device 10 may be stored on storage circuitry 36 (e.g., storage circuitry 36 may include non-transitory (tangible) computer readable storage media that stores the software code). The software code may sometimes be referred to as program instructions, software, data, instructions, or code. Software code stored on storage circuitry 36 may be executed by processing circuitry 38.

Control circuitry 34 may be used to run software on UE device 10 such as satellite navigation applications, internet browsing applications, voice-over-internet-protocol (VOIP) telephone call applications, email applications, media playback applications, operating system functions, etc. To support interactions with external equipment, control circuitry 34 may be used in implementing communications protocols. Communications protocols that may be implemented using control circuitry 34 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 5G protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), satellite communications protocols, or any other desired communications protocols. Each communications protocol may be associated with a corresponding radio access technology (RAT) that specifies the physical connection methodology used in implementing the protocol.

UE device 10 may store a satellite almanac such as almanac 42 on storage circuitry 36. Almanac 42 (sometimes referred to herein as satellite information 42 or satellite position information 42) may store position information for satellite 12 and/or for each of the satellites in the satellite constellation used by communications system 8. The position information may include information identifying the location of satellite 12 over Earth as a function of time (e.g., orbit information, elevation information, altitude information, inclination information, eccentricity information, orbital period information, trajectory information, right ascension information, declination information, ground track information, etc.), information identifying the velocity of satellite 12 (e.g., relative to the surface of Earth), and/or any other desired information identifying the position of satellite 12 relative to Earth or UE device 10. Almanac 42 may include a database, table, spreadsheet, list, or any other desired data structure and may be hard-coded or soft-coded on storage circuitry 36. Almanac 42 may include position and/or velocity information for each of the satellites in communications system 8. Almanac 42 may be generated upon the design, manufacture, assembly, testing, and/or calibration of UE device 10 and/or may be generated or updated periodically over time (e.g., during operation of UE device 10 by an end user, during a software update for UE device 10, in response to an application call, etc.).

UE device 10 may include input-output devices 44. Input-output devices 44 may be used to allow data to be supplied to UE device 10 and to allow data to be provided from UE device 10 to external devices. Input-output devices 44 may include user interface devices, data port devices, and other input-output components. For example, input-output devices 44 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to UE device 10 using wired or wireless connections (e.g., some of input-output devices 44 may be peripherals that are coupled to a main processing unit or other portion of UE device 10 via a wired or wireless link).

UE device 10 may also include wireless circuitry to support wireless communications. The wireless circuitry may include one or more antennas 40 and one or more radios 46. Each radio 46 may include circuitry that operates on signals at baseband frequencies (e.g., baseband processor circuitry), signal generator circuitry, modulation/demodulation circuitry (e.g., one or more modems), radio-frequency transceiver circuitry (e.g., radio-frequency transmitter circuitry, radio-frequency receiver circuitry, mixer circuitry for downconverting radio-frequency signals to baseband frequencies or intermediate frequencies between radio and baseband frequencies and/or for upconverting signals at baseband or intermediate frequencies to radio-frequencies, etc.), amplifier circuitry (e.g., one or more power amplifiers and/or one or more low-noise amplifiers (LNAs)), analog-to-digital converter (ADC) circuitry, digital-to-analog converter (DAC) circuitry, control paths, power supply paths, signal paths (e.g., radio-frequency transmission lines, intermediate frequency transmission lines, baseband signal lines, etc.), switching circuitry, filter circuitry, and/or any other circuitry for transmitting and/or receiving radio-frequency signals using antenna(s) 40. The components of each radio 46 may be mounted onto a respective substrate or integrated into a respective integrated circuit, chip, package, or system-on-chip (SOC). If desired, the components of multiple radios 46 may share a single substrate, integrated circuit, chip, package, or SOC.

Antenna(s) 40 may be formed using any desired antenna structures. For example, antenna(s) 40 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antenna(s) 40 over time. If desired, multiple antennas 40 may be implemented as a phased array antenna (e.g., where each antenna forms a radiator or antenna element of the phased array antenna, which is sometimes also referred to as a phased antenna array). In these scenarios, the phased array antenna may convey radio-frequency signals within a signal beam. The phases and/or magnitudes of each radiator in the phased array antenna may be adjusted so the radio-frequency signals for each radiator constructively and destructively interfere to steer or orient the signal beam in a particular pointing direction (e.g., a direction of peak signal gain). The signal beam may be adjusted or steered over time.

Transceiver circuitry in radios 46 may convey radio-frequency signals using one or more antennas 40 (e.g., antenna(s) 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antenna(s) 40 may transmit the radio-frequency signals by radiating the radio-frequency signals into free space (or to free space through intervening device structures such as a dielectric cover layer). Antenna(s) 40 may additionally or alternatively receive the radio-frequency signals from free space (e.g., through intervening devices structures such as a dielectric cover layer). The transmission and reception of radio-frequency signals by antenna(s) 40 each involve the excitation or resonance of antenna currents on an antenna resonating element in the antenna by the radio-frequency signals within the frequency band(s) of operation of the antenna.

Each radio 46 may be coupled to one or more antennas 40 over one or more radio-frequency transmission lines. The radio-frequency transmission lines may include coaxial cables, microstrip transmission lines, stripline transmission lines, edge-coupled microstrip transmission lines, edge-coupled stripline transmission lines, transmission lines formed from combinations of transmission lines of these types, etc. The radio-frequency transmission lines may be integrated into rigid and/or flexible printed circuit boards if desired. One or more of the radio-frequency lines may be shared between radios 46 if desired. Radio-frequency front end (RFFE) modules may be interposed on one or more of the radio-frequency transmission lines. The radio-frequency front end modules may include substrates, integrated circuits, chips, or packages that are separate from radios 46 and may include filter circuitry, switching circuitry, amplifier circuitry, impedance matching circuitry, radio-frequency coupler circuitry, and/or any other desired radio-frequency circuitry for operating on the radio-frequency signals conveyed over the radio-frequency transmission lines.

Radios 46 may use antenna(s) 40 to transmit and/or receive radio-frequency signals within different frequency bands at radio frequencies (sometimes referred to herein as communications bands or simply as a "bands"). The frequency bands handled by radios 46 may include satellite communications bands (e.g., the C band, S band, L band, X band, W band, V band, K band, $K_a$ band, $K_u$ band, etc.), wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications (NFC) frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

While control circuitry 34 is shown separately from radios 46 in the example of FIG. 2 for the sake of clarity, radios 46 may include processing circuitry that forms a part of processing circuitry 38 and/or storage circuitry that forms a part of storage circuitry 36 of control circuitry 34 (e.g., portions of control circuitry 34 may be implemented on radios 46). As an example, control circuitry 34 may include baseband circuitry or other control components that form a part of radios 46. The baseband circuitry may, for example, access a communication protocol stack on control circuitry 34 (e.g., storage circuitry 36) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

Figure 3:
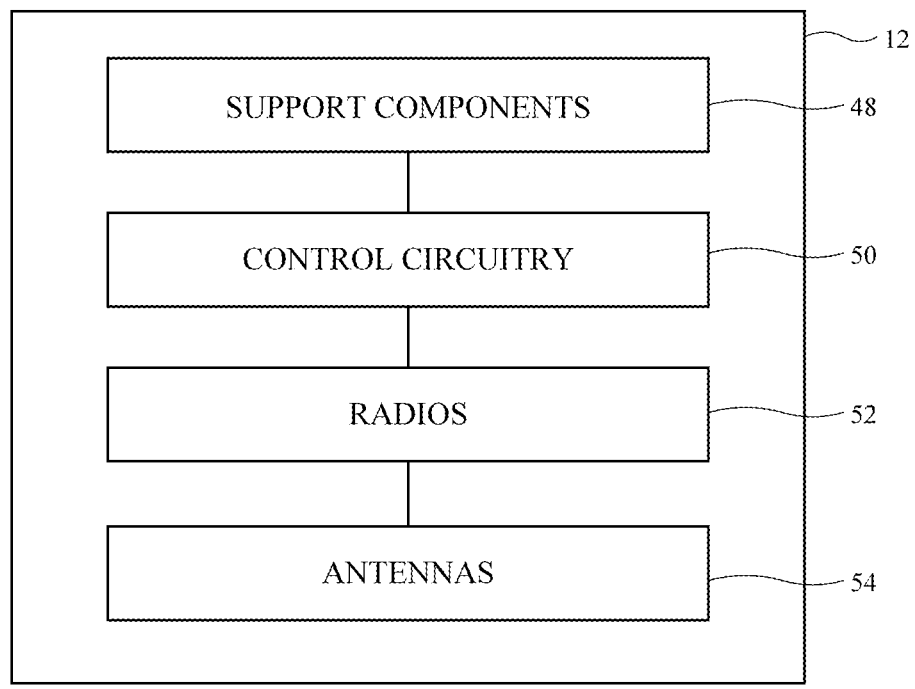
FIG. 3 is a schematic diagram of an illustrative communications satellite that communicates with user equipment devices in accordance with some embodiments.

FIG. 3 is a diagram of an illustrative satellite 12 in communications system 8. As shown in FIG. 3, satellite 12 may include satellite support components 48. Support components 48 may include batteries, solar panels, sensors (e.g., accelerometers, gyroscopes, temperature sensors, light sensors, etc.), guidance systems, propulsion systems, and/or any other desired components associated with supporting satellite 12 in orbit above Earth.

Satellite 12 may include control circuitry 50. Control circuitry 50 may be used in controlling the operations of satellite 12. Control circuitry 50 may include processing circuitry such as processing circuitry 38 of FIG. 2 and may include storage circuitry such as storage circuitry 36 of FIG. 2. Control circuitry 50 may also control support components 48 to adjust the trajectory or position of satellite 12 in space.

Satellite 12 may include antennas 54 and one or more radios 52. Radios 52 may use antennas 54 to transmit DL signals 26 and DL signals 30 and to receive UL signals 24 and UL signals 28 of FIG. 1 (e.g., in one or more satellite communications bands). Radios 52 may include transceivers, modems, integrated circuit chips, application specific integrated circuits, filters, switches, up-converter circuitry, down-converter circuitry, analog-to-digital converter circuitry, digital-to-analog converter circuitry, power amplifier circuitry, low noise amplifier circuitry, beam steering circuitry, etc.

Antennas 54 may include any desired antenna structures (e.g., patch antenna structures, dipole antenna structures, monopole antenna structures, waveguide antenna structures, Yagi antenna structures, inverted-F antenna structures, cavity-backed antenna structures, combinations of these, etc.). In one suitable arrangement, antennas 52 may include one or more phased array antennas. Each phased array antenna may include beam forming circuitry having a phase and magnitude controller coupled to each antenna element in the phased array antenna. The phase and magnitude controllers may provide a desired phase and magnitude to the radio-frequency signals conveyed over the corresponding antenna element. The phases and magnitudes of each antenna element may be adjusted so that the radio-frequency signals conveyed by each of the antenna elements constructively and destructively interfere to produce a radio-frequency signal beam in a desired pointing direction (e.g., an angular direction towards Earth at which the radio-frequency signal beam exhibits peak gain). Radio-frequency lenses may also be used to help guide the radio-frequency signal beam in a desired pointing direction. Each radio-frequency signal beam also exhibits a corresponding beam width. This allows each radio-frequency signal beam to cover a corresponding cell on Earth (e.g., a region on Earth overlapping the radio-frequency signal beam such that the radio-frequency signal beam exhibits a power greater than a minimum threshold value within that region/cell). The K UE devices 10 of FIG. 1 may be located within this cell. If desired, satellite 12 may offload some or all of its beam forming operations to gateway 14.

Gateway 14 (FIG. 1) may include control circuitry similar to control circuitry 50 of FIG. 3 or control circuitry 34 of FIG. 2, radios similar to radios 46 of FIG. 2 or radios 52 of FIG. 3, and antennas similar to antennas 54 of FIG. 3 or antennas 40 of FIG. 2. The antennas on gateway 14 may be mechanically adjustable for tracking one or more satellites in communications system 8 as the satellites move through space. Gateway 14 may include communications circuitry that serves as an interface between satellite 12 and terrestrial network 6 (e.g., that converts communications data between a format handled by satellite 12 and a format handled by terrestrial network 6). NOC 6 (FIG. 1) may use gateway 14 to send control commands to satellite 12 (e.g., using UL signals 28 of FIG. 1) that control communications and/or positioning for satellite 12. Terrestrial network UE devices 20 of FIG. 1 may have similar components to UE device 10 of FIG. 2, may be similar UE devices to UE device 10 but without satellite communications capabilities, or may be other communications equipment for communicating with UE devices 10 via satellite 12 (e.g., terrestrial network UE device 20 may include desktop or laptop computers, cellular telephones, media players, wearable devices, servers, etc.). While terrestrial network UE devices 20 are sometimes referred to herein as UE devices, terrestrial network UE devices may include any desired computing and/or communications equipment and need not form user equipment and need not be operated by an end user (e.g., terrestrial network UE devices 20 may be operated by one or more network carriers or service providers, regulatory bodies, government agencies, emergency service providers, end users, standards bodies, manufacturers, etc.).

In practice, satellite 12 generally has no a priori knowledge of how many UE devices 10 are located within its coverage area, let alone when the UE devices are transmitting reverse link data to be transmitted to gateway 14. In general, radio-frequency signals are constantly incident on satellite 12 from within its coverage area on Earth regardless of transmission source. When satellite 12 receives radio-frequency signals, satellite 12 and/or gateway 14 needs to determine whether the received radio-frequency signals include reverse link UL signals 24 (FIG. 1) transmitted by the UE devices 10 in its coverage area and needs to distinguish between the reverse link UL signals 24 transmitted by different UE devices 10 (e.g., to allow each of the K UE devices 10 to properly communicate with terrestrial network 6 via gateway 14). This involves searching the radio-frequency signals received at satellite 12 over time and frequency to distinguish between reverse link UL signals 24 and other background noise not associated with a reverse link. However, searching for reverse link UL signals across all time can consume an excessive amount of processing resources given the relatively low output power level of UE devices 10 and the large path length between UE devices 10 and satellite 12. In other words, it can be difficult for the network to distinguish UL signals 24 from other signals incident upon satellite 12 due to the low signal-to-noise ratio of UL signals 24 at satellite 12.

Figure 4:
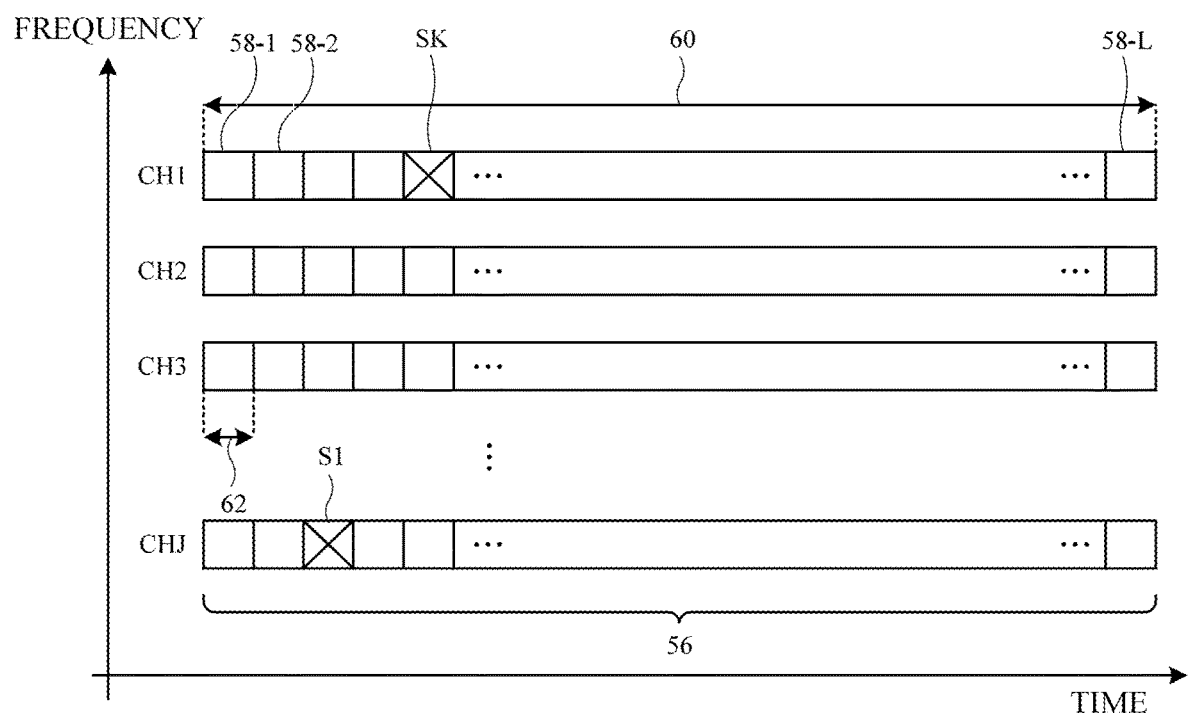
FIG. 4 is a diagram showing how multiple user equipment devices may transmit radio-frequency signals for receipt at a communications satellite within different time slots and channels of a narrow time window in accordance with some embodiments.

In order to mitigate these issues, each of the K UE devices 10 located in the coverage area (cell) for satellite 12 may transmit UL signals 24 that begin arriving at satellite 12 within a finite and predetermined narrow time window. This may allow satellite 12 and/or gateway 14 to identify UL signals 24 from the K UE devices 10 by only searching over the narrow time window rather than over all time, greatly reducing the processing burden on the network. FIG. 4 is a diagram showing how the K UE devices 10 may transmit UL signals 24 for arrival at satellite 12 within the narrow time window.

As shown by FIG. 4, communications system 8 may define a narrow time window 56 for reverse link communications between UE devices 10 and satellite 12. The horizontal axis of FIG. 4 plots time and the vertical axis of FIG. 4 plots frequency. Narrow time window 56 may have duration 60. Duration 60 may be 1 ms, 0.1-2.0 ms, greater than 1 ms, 1-2 ms, 0.5-1.5 ms, 1.0-5.0 ms, 0.1-10 ms, greater than 2 ms, greater than 10 ms, 10-100 ms, or any other desired duration. Narrow time window 56 may sometimes be referred to herein as limited time window 56, predetermined time window 56, finite time window 56, constrained time window 56, period 56, time window 56, or window 56.

UE devices 10 may transmit reverse link signals in J different channels CH at different frequencies (e.g., a first channel CH1, a second channel CH2, a Jth channel CHJ, etc.). The number J may be 1, 2, 3, 4, 5, 6, 7, 8, or more than 8. Each channel CH of narrow time window 56 may be subdivided into L time slots 58 (e.g., each channel may include a first time slot 58-1, a second time slot 58-2, an Lth time slot 58-L, etc.). Each time slot 58 may have duration 62. Duration 62 may be associated with the minimum amount of time required for a receiver in radios 52 on satellite 12 (FIG. 3) to extract the UL data from UL signals 24 (e.g., as determined by chip/code rate). Duration 62 may be, for example, 5 µs, greater than 5 µs, 1-10 vs, 10 vs, greater than 10 µs, or other values. When duration 62 is 5 µs and duration 60 is 1 ms, there may be L=200 time slots 58 in each channel CH, for example.

Each of the K UE devices 10 may identify a common time reference (e.g., a true time that is synchronized to the timing of satellite 12) based on DL signals 26 received from satellite 12. This common time reference may allow each of the K UE devices 10 in the coverage area for satellite 12 to select a respective time slot 58 within narrow time window 56 for the arrival of its own UL signals 24 at satellite 12. If desired, each UE device 10 may select a time slot 58 at random to minimize the risk of multiple UE devices 10, which are unlikely to be able to communicate directly with each other, selecting the same time slot 58 in narrow time window 56. Once the common time reference is known at each UE device 10, each UE device 10 may begin transmitting UL signals 24 at a time that allows the UL signals to be received at satellite 12 beginning in its selected time slot 58.

In practice, each UE device 10 is located at a different distance or path length (PL) from satellite 12. For instance, in the example of FIG. 1, UE device 10-1 is located at a first path length PL1 from satellite 12 whereas UE device 10-K is located at a second path length PLK from satellite 12 that is less than path length PL1. UE device 10-1 therefore needs to begin transmitting UL signals 24 earlier than UE device 10-K for the UL signals to arrive at satellite 12 at the same time. Each UE device 10 may estimate the pathloss PL between itself and satellite 12 to determine when the UE device needs to begin UL transmission for the UL signals to arrive at satellite 12 within its respective time slot 58.

For example, as shown in FIG. 4, UE device 10-1 may select time slot S1 in channel CHJ and UE device 10-K may select time slot SK in channel CH1 of narrow time window 56. UE device 10-1 may generate a timing advance for transmitting UL signals 24 that allows the UL signals to begin arriving at satellite 12 within time slot S1 after traversing path length PL1 (e.g., at the speed of light). Similarly, UE device 10-K may generate a timing advance for transmitting UL signals 24 that allows the UL signals to begin arriving at satellite 12 within time slot SK after traversing path length PLK. Each of the UE devices 10 in the coverage area for satellite 12 may generate timing advances in this way so all of the UL signals being to arrive at satellite 12 within narrow time window 56. Rather than searching over all time, satellite 12 need only search over narrow time window 56 to identify all of the UL signals transmitted by the UE devices 10 in its coverage area, thereby minimizing the processing burden on satellite 12 in performing reverse link communications.

Figure 5:
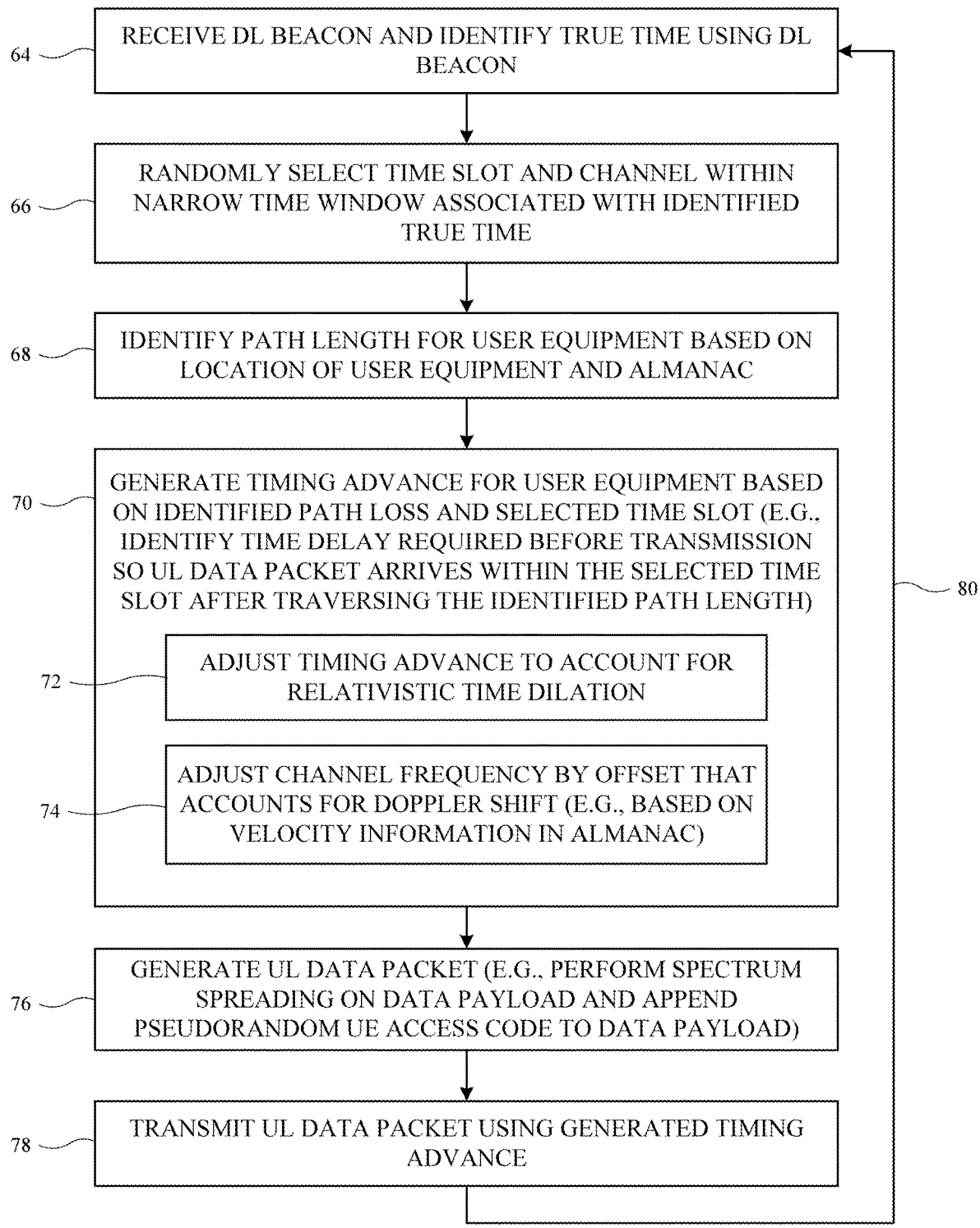
FIG. 5 is a flow chart of illustrative operations that may be performed by a user equipment device to transmit radio-frequency signals that are received at a communications satellite within a narrow time window in accordance with some embodiments.

FIG. 5 is a flow chart of illustrative operations that may be performed by each of the K UE devices 10 in the coverage area of satellite 12 for performing reverse link communications (e.g., for transmitting reverse link data to a terrestrial network UE device 20 via satellite 12, gateway 14, and network portion 18 of FIG. 1).

At operation 64, UE device 10 may receive DL signals 26 from satellite 12 (e.g., using antennas 40 and radios 46). The DL signals may include a DL beacon. The DL beacon may identify a time reference as used by satellite 12 (sometimes referred to herein as true time or network time). This time reference may be used by each of the UE devices in the coverage area for satellite 12 to ensure that each of the UE devices and satellite 12 are time-synchronized. Time-synchronizing the UE devices and satellite 12 may allow each of the UE devices to transmit UL signals that begin to arrive at satellite 12 within desired time slots 58 of narrow time window 56.

At operation 66, control circuitry 34 on UE device 10 may select a time slot 58 and a channel CH within narrow time window 56 for subsequent UL transmission. If desired, each UE device 10 may select a time slot 58 and a channel CH at random to minimize the likelihood that two UE devices will provide UL signals to satellite 12 that interfere with each other and that are thus unable to be distinguished or identified by satellite 12. For example, UE device 10-1 may select time slot S1 of FIG. 4.

At operation 68, control circuitry 34 may identify (e.g., compute, generate, calculate, deduce, determine, estimate, etc.) the path length PL between itself and satellite 12. UE device 10 may identify path length PL based on its current location and based on the present or expected future location of satellite 12. UE device 10 may identify its current location using GPS data or other satellite navigation data (e.g., gathered using signals transmitted by a satellite navigation system that includes satellites that are separate from the satellite constellation associated with communications system 8), accelerometer data, compass data, gyroscope data, camera or image sensor data, light detection and ranging (Lidar) data, radar data, location information from a terrestrial base station or access point, angle-of-arrival data, time of flight data, range data produced using UWB signals transmitted or received by device 10, receive signal strength data or other wireless performance metric data, and/or any other desired location data gathered at UE device 10. UE device 10 may identify the current or expected location of satellite 12 based on (using) satellite position information stored in almanac 42 (FIG. 2). If desired, UE device 10 may also identify the current or expected velocity of satellite 12 using almanac 42.

At operation 70, control circuitry 34 may generate (e.g., identify, compute, calculate, deduce, determine, estimate, etc.) a timing advance based on the identified path length PL and the selected time slot 58. The timing advance may, for example, correspond to the amount of time that UE device 10 needs to wait before transmitting UL signals 24 (e.g., a time delay) for the UL signals to begin arriving at satellite 12 within the selected time slot 58 after traversing path length PL. Control circuitry 34 may, for example, generate the timing advance based on the true time identified by the DL beacon, the known velocity of UL signals 24 (e.g., the speed of light, optionally corrected for atmospheric effects), and the identified path length PL.

If desired, control circuitry 34 may adjust the timing advance to compensate for relativistic time dilation (at operation 72). For example, control circuitry 34 may adjust the timing advance to ensure that the UL signals begin to arrive at satellite 12 within the selected time slot 58 after traversing path length PL, given general relativistic time dilation on account of Earth's gravity and the UE device being located closer to Earth's center of mass than satellite 12.

If desired, control circuitry 34 may adjust the frequency of the selected channel CH by an offset value that compensates for the doppler shift of UL signals 24 due to the velocity of satellite 12 relative to UE device 10 (at operation 74). Control circuitry 34 may identify the offset value based on velocity information for satellite 12 as stored on almanac 42 (FIG. 2) and/or based on sensor data identifying the velocity/orientation of UE device 10, for example.

At operation 76, control circuitry 34 (e.g., baseband circuitry on radios 46) may generate (e.g., assemble, compile, produce, modulate, synthesize, etc.) a UL data packet for transmission to satellite 12 within UL signals 24. The UL data packet (sometimes referred to herein as a reverse link data packet) may have a data payload that includes any desired data (e.g., message data, video data, audio data, call data, user data, application data, etc.). In some scenarios, the low data rate supported by the satellite-to-user equipment link may limit the data payload to message data or other text-based data. If desired, control circuitry 34 may perform spectrum spreading on the data payload to minimize the risk of errors in the data payload as received at satellite 12 (e.g., errors that arise due to the relatively low transmit power level of UE device 10 and the relatively long path length PL between UE device 10 on Earth and satellite 12 in space). The UL data packet may also include a pseudorandom UE access code. The pseudorandom UE access code may be appended to the data payload (e.g., as a header). The pseudorandom UE access code may be shared by each of the UE devices 10 in the coverage area for satellite 12 and may be known to satellite 12. Satellite 12 may use the pseudorandom UE access code to distinguish UL signals 24 from other unrelated background noise.

At operation 78, UE device 10 may transmit the UL data packet to satellite 12 within UL signals 24 using (e.g., according to or based on) the generated timing advance. Radio(s) 46 may transmit UL signals 24 over antenna(s) 40 within the selected channel (and optionally offset in frequency to compensate for doppler shifts, as performed at operation 74). In other words, UE device 10 may begin transmitting the UL data packet after waiting for the time period corresponding to the timing advance. This may cause the UL data packet to begin arriving at satellite 12 within the selected time period 58 of narrow time window 56. For example, the UL data packet transmitted by UE device 10-1 may arrive at satellite 12 within time period S1 of FIG. 4. Given the limited power of UE device 10 and the relatively long path length PL, it may take as long as 1-2 seconds to fully transmit the UL data packet to satellite 12. If desired, the system may use a relatively high modulation scheme or coding rate to help to increase data rate.

If desired, satellite 12 may forward/route the radio-frequency signals received by satellite 12 (e.g., including the UL signals 24 transmitted by UE device 10) to gateway 14 in downlink signals 30 for subsequent processing (e.g., in a bent-pipe configuration with frequency translation). Gateway 14 may also compensate for doppler shifting between satellite 12 and gateway 14. Gateway 14 may compute (e.g., calculate, generate, identify, estimate, etc.) the doppler shift between satellite 12 and gateway 14 based on the velocity of satellite 12 relative to gateway 14. Gateway 14 may, for example, compute the velocity of satellite 12 using satellite ephemeris information available to the gateway. After these compensations, the amount of the doppler frequency shift that gateway 14 experiences may be much lower than the actual doppler shift. Processing may subsequently loop back to operation 64 via path 80 (e.g., the operations of FIG. 5 may be performed to transmit each UL data packet that UE device 10 needs to transmit to terrestrial network 6 via satellite 12). Each iteration of the operations of FIG. 5 may last 2-3 seconds, as an example. Transmitting the UL data packets in this way may ensure that UE device 10 is able to send correct reverse link data to terrestrial network UE device 20 but may, for example, only support relatively UL low data rates (e.g., data rates of 100-1000 bits/s) due to the constraints associated with the satellite-to-user equipment link.

When each of the UE devices transmit a UL data packet in this manner, all of the UL data packets first arrive at satellite 12 within narrow time window 56 (e.g., where each UL data packet first arrives at satellite 12 within a corresponding time slot 58). This may allow satellite 12 and/or gateway 14 to identify and distinguish the UL data packets transmitted by each of the UE devices 10 without having to search over all time, thereby minimizing the processing burden on the network. The example of FIG. 5 is merely illustrative. If desired, operation 76 may be performed prior to, concurrent with, or after any of operations 64-74. Operation 68 may be performed prior to or concurrent with operation 66.

Figure 6:
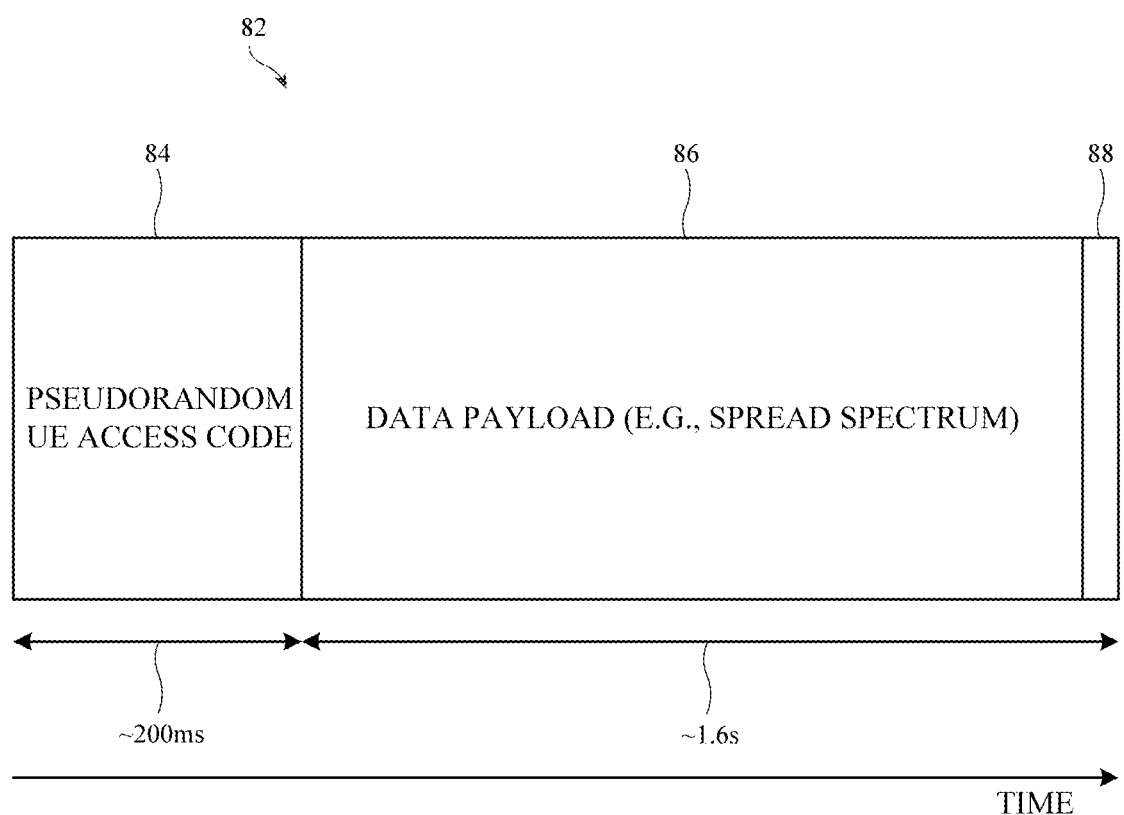
FIG. 6 is a diagram of an illustrative uplink data packet that may be transmitted by a user equipment device for receipt at a communications satellite within a narrow time window in accordance with some embodiments.

FIG. 6 is a diagram of an illustrative UL data packet 82 that may be produced by control circuitry 34 (e.g., at operation 76 of FIG. 5) and transmitted to satellite 12 (e.g., at operation 78 of FIG. 5). As shown by FIG. 6, UL data packet 82 may include a data payload 86. If desired, data payload 86 may be a spread spectrum data payload to minimize data errors at satellite 12. UL data packet 82 may also include pseudorandom UE access code 84. Pseudorandom UE access code 84 may be appended to the beginning of data payload 86 (e.g., as a header of UL data packet 82). Pseudorandom UE access code 84 may be shared by UE devices 10 and may be known to satellite 12. If desired, control circuitry 34 may append forward error correction bits 88 to data payload 86 (e.g., for performing forward error correction according to a forward error correction protocol such as 5G NR forward error correction). These bits may include random bits, parity check codes, etc.

When satellite 12 receives UL data packet 82, satellite 12 first receives pseudorandom UE access code 84 (e.g., within the time slot 58 selected by the transmitting UE device). This may help satellite 12 (or gateway 14 when satellite 12 operates in a bent-pipe configuration) to distinguish and identify UL data packet 82 from other background noise. It may take around 200 ms for satellite 12 to fully receive pseudorandom access code 84, as an example. Data payload 86 forms the bulk of UL data packet 82 and may take as long as 1-2 seconds (e.g., approximately 1.6 s) to be fully received by satellite 12. Satellite 12 or gateway 14 may reverse any spectrum spreading in data payload 86 to recover the reverse link data that UE device 10 intends to transmit to terrestrial network 6.

Figure 7:
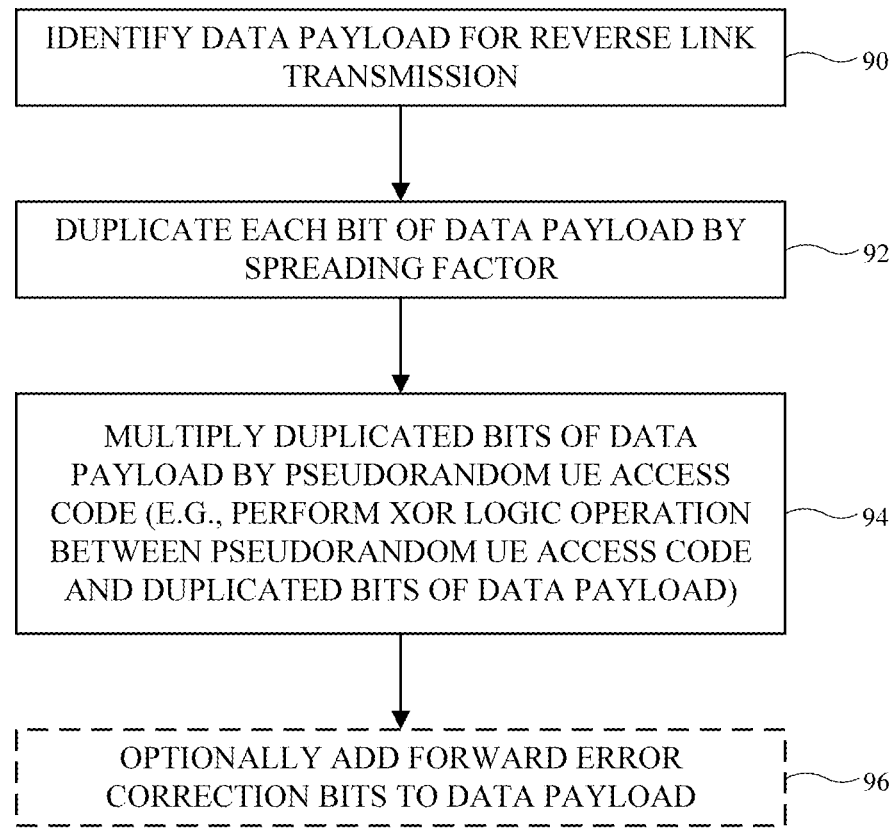
FIG. 7 is a flow chart of illustrative operations that may be performed by a user equipment device to generate an uplink data packet of the type shown in FIG. 6 in accordance with some embodiments.

FIG. 7 is a flow chart of illustrative operations that may be performed by control circuitry 34 on UE device 10 to generate UL data packet 82 for transmission to gateway 14 via satellite 12. The operations of FIG. 7 may, for example, be performed while processing operation 76 of FIG. 5.

At operation 90 of FIG. 7, control circuitry 34 may identify (e.g., assemble, compile, obtain, generate, produce, retrieve, etc.) a data payload for reverse link transmission. For example, control circuitry 34 may identify a message or other data produced by a software application running on UE device 10 and/or input to UE device 10 by a user (e.g., using a user input device such as a touch screen or keyboard) as the data payload. At the lowest level, the data payload includes a series (sequence) of bits having binary values "1" or "0."

If desired, control circuitry 34 may perform spectrum spreading operations that serve to minimize errors in the data payload as received at satellite 12 and gateway 14. Control circuitry 34 may generate UL data packet 82 using any desired waveform such as a 3GPP LTE waveform (e.g., by modulating the data payload and any header fields onto the waveform). Given the relatively low output power level of UE device 10 and the relatively long path length PL, the waveform used to transmit UL data packet 82 may be insufficient on its own to ensure that every bit of the data payload is correctly received at satellite 12. Data repetition and spectrum spreading may mitigate this risk by distributing the data payload over a relatively wide bandwidth (e.g., 150 kHz, 180 kHz, 200 kHz, more than 150 kHz, more than 180 kHz, etc.) and a relatively wide time period. Control circuitry 34 may distribute the data payload over a relatively wide time period via data repetition by duplicating the bits in the data payload.

At operation 92, control circuitry 34 may perform data repetition by duplicating each bit of the data payload by a corresponding spreading factor. The spreading factor may be 2X, 3X, 4X, 10X, 100X, between 2-1000X, or any other desired spreading factor. The spreading factor may also be known to satellite 12 and/or gateway 14. Consider an example in which control circuitry 34 identifies the series of bits "101" as reverse link data to be transmitted to satellite 12 and in which control circuitry 34 uses a spreading factor of 3X. In this example, control circuitry 34 may duplicate each of the "1," "0," and "F" bits three times to produce the series of duplicated bits "111000111," which replaces the original series of bits "101" for subsequent processing.

At operation 94, control circuitry 34 may perform spreading by multiplying the series of duplicated bits in data payload 86 by pseudorandom UE access code 84 (e.g., by performing a logic XOR operation between the pseudorandom UE access code and the series of duplicated bits or each data symbol). The product of this multiplication operation may replace the data payload 86 in UL data packet 82 (e.g., as a spread spectrum data payload) and may run at a much higher rate relative to the data symbols, resulting in an extension of the signal bandwidth (e.g., by 150 kHz, 180 kHz, 200 kHz, more than 150 kHz, more than 180 kHz, etc.).

If desired, control circuitry 34 may add forward error correction bits 88 to UL data packet 82 at optional operation 96. UE device 10 may then modulate and transmit the UL data packet 82 having the spread spectrum data payload formed by the multiplication of the series of duplicated bits with the pseudorandom UE access code. Control circuitry 14 may perform an inverse fast Fourier transform (IFFT) to take the UL data packet from the frequency domain to the time domain prior to transmission of the UL data packet within UL signals 24. Satellite 12 may receive the UL signals. Satellite 12 or gateway 14 (in scenarios where satellite 12 forwards its received signals to gateway 14 in a bent-pipe configuration) may perform a fast Fourier transform (FFT) to take the UL data packet from the time domain back to the frequency domain. Satellite 12 or gateway 14 may then reverse the spreading and the time extension performed by UE device 10 to recover the original data payload for the UL data packet (e.g., as identified by control circuitry 34 while processing operation 90).

To improve the error correction capability of transmitted UL data packets, UE device 10 may use a relatively high order modulation scheme or coding rate (e.g., data rates such as 2.5 kbps, 5 kbps, 10 kbps, 20 kbps, etc.) for transmitting UL data packet 24 in UL signals 24 (e.g., while performing operation 78 of FIG. 5). As one example, control circuitry 34 on UE device 10 may encode UL data packet 24 using low-density parity check (LDPC) encoding. Consider an example in which the code rate is 1/5. This means that for every binary phase-shift keying (BPSK) modulated input, the encoding outputs 5 encoded data. The control circuitry then maps the encoded data to a physical resource block (PRB) of 12*14 resource elements (e.g., the PRB has 168 resource elements). Each LDPC-coded data symbol (modulated with BPSK modulation, as an example) covers two columns (24 resource elements of the PRB), so 5 LDPC-encoded symbols fill 120 resource elements, whereas the remaining 48 resource elements are filled with unmodulated data and are used for carrier recovery. Each PRB is then repeated 10 times (e.g., at operation 92 of FIG. 7 under a 10X spreading factor). Thus, the data frame includes 100 unmodulated data used for time and frequency offset estimation and 880 LDPC-encoded, BPSK modulated inputs. After mapping, this will generate 12*14*10 (880+100)/5=12*27440 resource elements. The grid of 12*27440 is then multiplied by a pseudorandom sequence (e.g., the pseudorandom UE access code) of the same size to generate the spread signal (e.g., at operation 94 of FIG. 7). Thus, each LDPC symbol has a slice of 10 consecutive PRBs, but each PRB receives a different spreading sequence. In other words, five coded data are generated, mapped to 120 resource elements, and then each resource block is repeated 10 times giving a spread gain of 1200. Control circuitry 34 then performs an FFT on the columns of this 12*27440 grid, where 12 represents the number of subcarriers in this case to generate complex data of 12*27440. The control circuitry may then perform single-carrier frequency-division multiple access (SC-FDMA) modulation using an FFT size of 128. Here, 12 symbols from the output of the FFT in the previous stage are mapped to 128 symbols and then the control circuitry performs the IFFT to convert back to the time domain. The control circuitry may then add the cyclic prefix and UL data packet 82 is ready for transmission to satellite 12. These numbers are merely illustrative and provided as just one implementation example for the sake of illustration.

Figure 8:
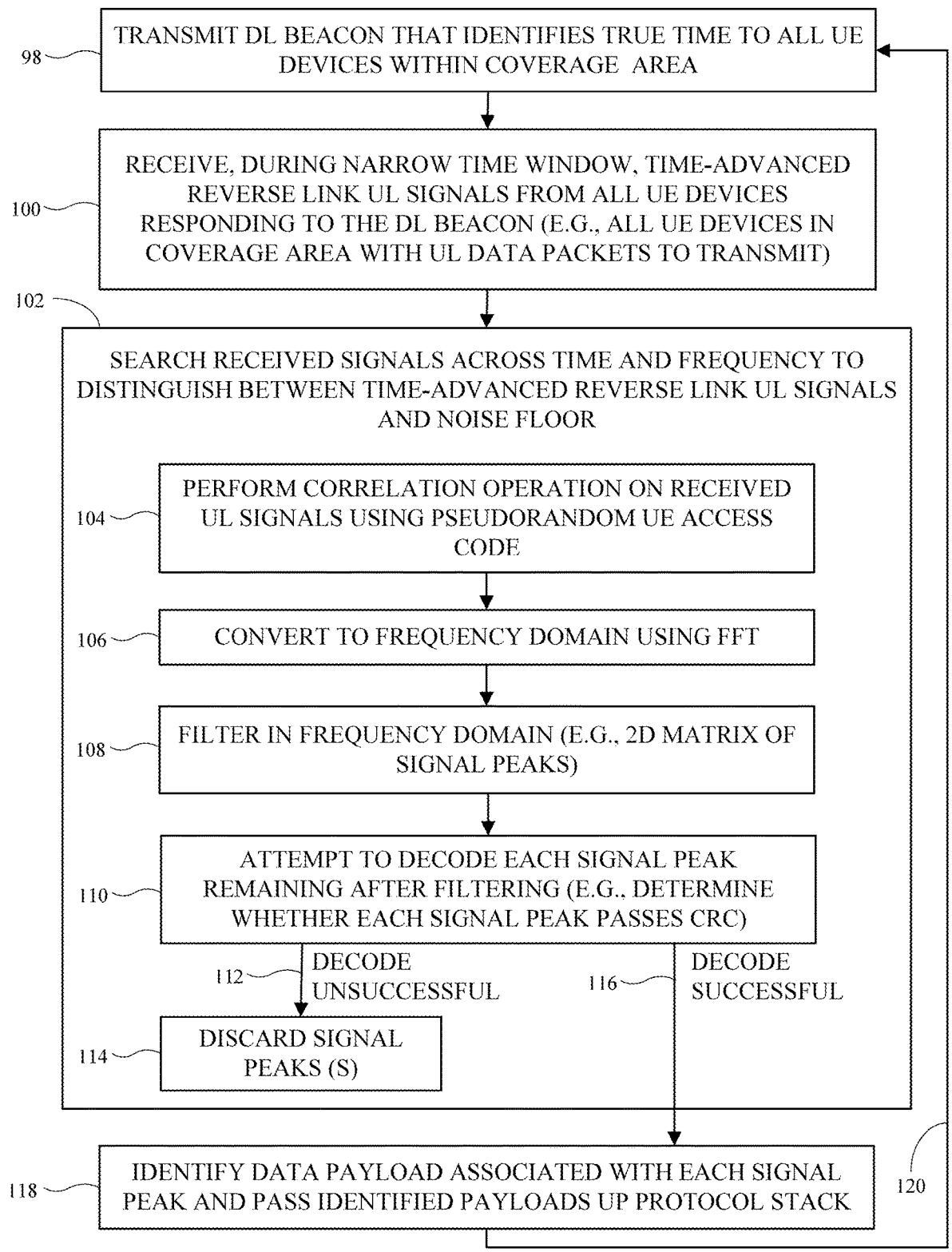
FIG. 8 is a flow chart of illustrative operations that may be performed by a communications satellite and/or gateway to identify and process uplink data packets received from multiple user equipment devices within a narrow time window in accordance with some embodiments.

FIG. 8 is a flow chart of illustrative operations that may be performed by satellite 12 and/or gateway 14 in receiving UL data packets from each of the K UE devices 10 in the coverage area of satellite 12 during narrow time window 56.

At operation 98 of FIG. 8, satellite 12 may transmit DL (forward link) signals 26 to the UE devices 10 in its coverage area. The DL signals may include a DL beacon. The DL beacon may identify the true time used to synchronize each of the K UE devices in the cell to timing on satellite 12.

At operation 100, satellite 12 may receive the time-advanced UL signals 24 transmitted by each of the UE devices responding to the DL beacon. The responding UE devices may be, for example, the UE devices 10 within the coverage area for satellite 12 that have reverse link data to transmit to one or more terrestrial network UE devices 20 of FIG. 1. Satellite 12 may begin to receive all of the UL signals within narrow time window 56 (e.g., because of the time advances performed by the UE devices while processing the operations of FIG. 5). Satellite 12 may also receive other radio-frequency signals and background noise during narrow time window 56. The remaining operations of FIG. 8 may be performed by satellite 12 or may be performed by gateway 14 in scenarios where satellite 12 forwards its received radio-frequency signals to gateway 14 for processing (e.g., when satellite 12 operates in a bent-pipe configuration).

At operation 102, satellite 12 or gateway 14 may search all of the radio-frequency signals first received during narrow time window 56 for the UL signals 24 transmitted by UE devices 10. Satellite 12 or gateway 14 may perform this search over time (e.g., over duration 60 of narrow time window 56) and over frequency (e.g., over channels CH1-CHJ). This search may consume far fewer processing resources and far less power than it would otherwise require in scenarios where UE devices 10 do not perform advances (e.g., scenarios where satellite 12 or gateway 14 needs to search over all time).

In performing the search, control circuitry 50 on satellite 12 or control circuitry on gateway 14 may perform a correlation operation on the received radio-frequency signals using pseudorandom access code 84 (at operation 104). After correlating the received radio-frequency signals with the pseudorandom access code, the control circuitry may convert the correlated signals from the time domain to the frequency domain at operation 106. The control circuitry may perform this conversion using one or more FFTs, for example.

The frequency domain signals may be in the form of a two-dimensional matrix, for example. At operation 108, the control circuitry may filter the frequency domain signals (e.g., the two-dimensional matrix) to remove background noise, spurious signals, outlier signals, etc. The filtering may, for example, remove all signals that are below a threshold signal level and/or all signals that are less than a predetermined magnitude above a noise floor in the two-dimensional matrix. In other words, the control circuitry may perform a peak detection algorithm on the received radio-frequency signals at operation 108.

In general, the two-dimensional matrix input to the peak detection algorithm is very large. One axis of the matrix may cover a relatively large bandwidth that includes multiple wireless channels. The other axis of the matrix extends over finite time window 56 of FIG. 4 (e.g., having a duration 60 of 5 ms). The FFTs performed by the control circuitry (at operation 106) are therefore quite large (e.g., around 384,000 points) to cover the whole bandwidth, and need to be repeated over the time axis (e.g., finite time window 56). The control circuitry may know how far the peak can be from a center frequency of each channel (e.g., given the worse uncompensated doppler shift, the oscillator frequency deviation of UE devices 10, and/or other impairments). Given this information, the FFT size may be reduced by processing each channel separately (e.g., by running all channels in parallel), filtering out the data from other channels using a chain of cascaded integrator-comb (CIC) filters, which have relatively low computational complexity, and focusing on the bandwidth of interest to reduce the size of the FFTs to 2000-4000 points, for example.

Any signal peaks remaining in the two-dimensional matrix after filtering may be potential UL data packets 82 (e.g., potential UL signals 24). However, not all of the remaining signal peaks are UL data packets 82. In order to identify which of the remaining signal peaks are true UL data packets 82 (UL signals 24), the control circuitry may attempt to decode each remaining signal peak at operation 110. For example, the control circuitry may determine whether each remaining signal peak passes a cyclic redundancy check (CRC). If the control circuitry is unable to decode any of the remaining signal peaks, as shown by path 112 (e.g., when the remaining signal peak fails the CRC), the control circuitry may determine that those remaining signal peaks are not UL signals 24 containing UL packets 82 and the signal peaks may be discarded (at operation 114). If the control circuitry is able to decode any of the remaining signal peaks, as shown by path 116 (e.g., when the remaining signal peaks pass the CRC), the control circuitry may determine that those remaining signal peaks are UL signals 24 containing UL packets 82 and processing may proceed to operation 118. Operation 110 may be performed for each of the signal peaks remaining after filtering to distinguish between true UL signals 24 containing UL packets 82 and noise or other signals that do not contain UL packets 82 for the reverse link.

At operation 118, the control circuitry may identify (e.g., recover, obtain, determine, etc.) the data payload associated with each of the successfully decoded signal peaks (e.g., the data payload associated with each of the UL signals 24 and UL data packets 82 received from UE devices 10). If desired, control circuitry 50 may reverse the data repetition and spectrum spreading performed by UE devices 10 to recover the data payloads. Once the data payloads have been recovered, control circuitry 50 may pass the data payloads up the protocol stack for further processing (e.g., to recover the higher-level message or other data in the data payload intended for receipt at terrestrial network UE device 20, etc.). Gateway 14 may forward the recovered data payloads to terrestrial network UE devices 20 via network portion 18, thereby completing the reverse link between UE devices 10 and terrestrial network UE devices 20 (e.g., creating a multiple user access channel in the reverse link direction from UE devices 10 to terrestrial network UE devices 20 via satellite 12 and gateway 14). Processing may subsequently loop back to operation 98 via path 120 as satellite 12 receives additional UL data packets from UE devices 10.

Figure 9:
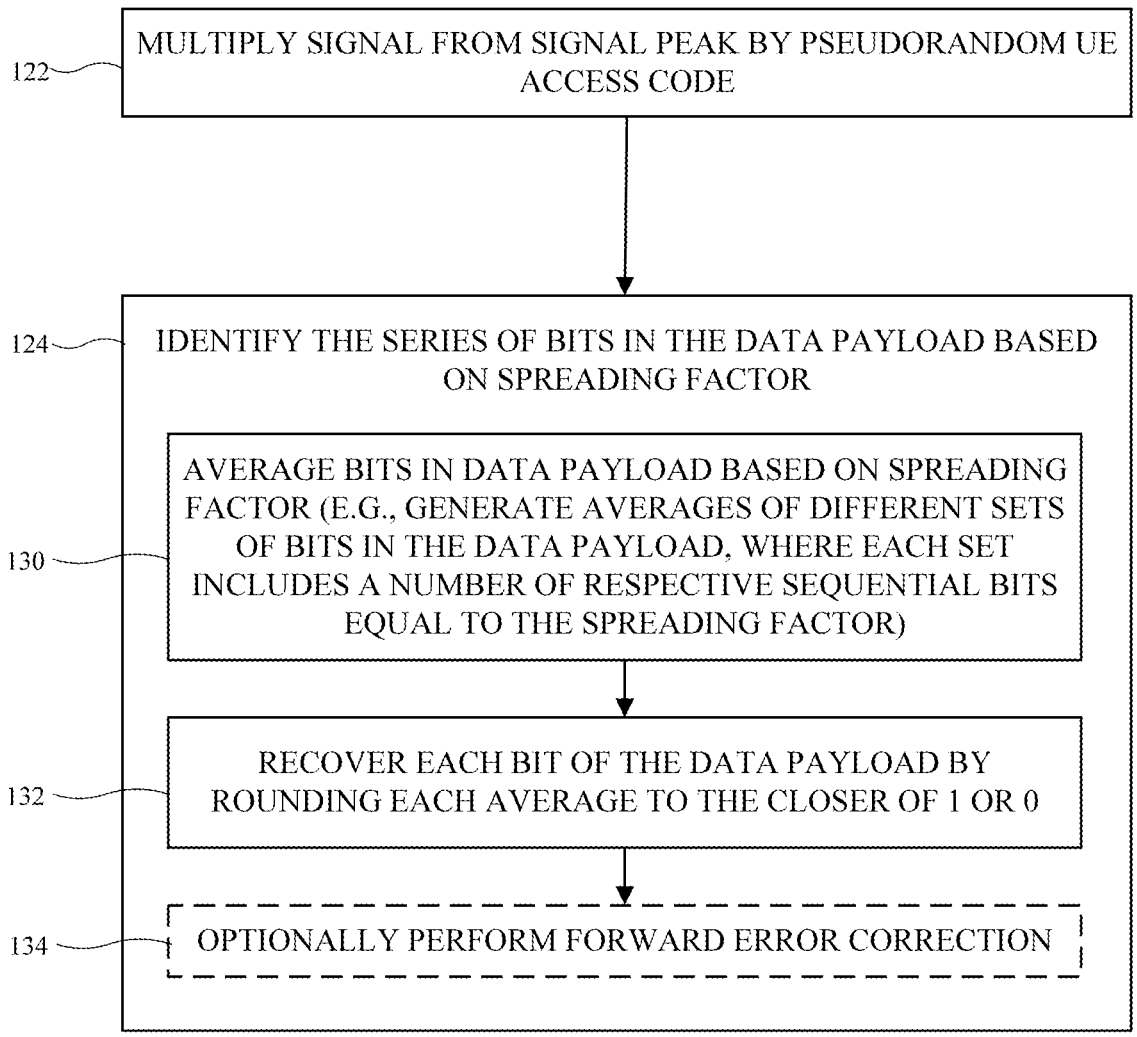
FIG. 9 is a flow chart of illustrative operations that may be performed by a communications satellite and/or gateway to identify a data payload in an uplink data packet received from a user equipment device within a narrow time window in accordance with some embodiments.

FIG. 9 is a flow chart of illustrative operations that may be performed by satellite 12 or gateway 14 in identifying the data payload associated with each successfully decoded signal peak. The operations of FIG. 9 may, for example, be performed while processing operation 118 of FIG. 8 on a given successfully decoded signal peak (e.g., on the UL signals 28 and the UL data packet 82 transmitted by a given UE device 10).

At operation 122, control circuitry 50 on satellite 12 or control circuitry on gateway 14 may multiply the successfully decoded signal peak by pseudorandom UE access code 84 (e.g., by performing a logic XOR operation between the pseudorandom UE access code and the series of bits in the successfully decoded signal peak). This may serve to reverse the vector multiplication performed by the corresponding UE device 10 at operation 94 of FIG. 7.

At operation 124, the control circuitry may identify the series of bits in the data payload 86 of the UL data packet 82 in the successfully decoded signal peak based on the spreading factor used by UE device 10 in generating UL data packet 82 (e.g., while processing operation 92 of FIG. 7). In an ideal scenario where there were no data errors during the time-of-flight between UE device 10 and satellite 12, the control circuitry may simply reverse the duplication by the spreading factor that was performed by UE device 10 to recover the original bits of the data payload.

However, in practice, there will likely be data errors in the received data payload 86. In order to mitigate these errors, the control circuitry may average the bits in the received data payload based on the spreading factor (at operation 130). For example, the control circuitry may generate average values of different sets of bits in the received data payload, where each set of bits includes a number of respective sequential bits and where the number is equal to the spreading factor.

At operation 132, the control circuitry may recover each bit of the original data payload by rounding each average value to the closer of binary values "1" or "0." Each rounded value is highly likely to be the same as the original value in the original data payload as identified by UE device 10 at operation 90 of FIG. 7.

Consider the example in which UE device 10 identified the series of bits "101" for transmission with a 3X spreading factor. In this example, the control circuitry should expect to recover the series of duplicated bits "111000111" after multiplying by the pseudorandom UE access code. However, errors in the received UL signals may be reflected in the recovered series of duplicated bits. For example, the control circuitry may instead recover a series of duplicated bits such as "101000110" after performing operation 122. In this example, the control circuitry may generate average values for every set of three bits in the series of duplicated bits (because the spreading factor is 3X). The control circuitry may therefore generate a first average value for the first set of three bits "101" that is equal to 0.6667, may generate a second average value for the second set of three bits that is equal to 0, and may generate a third average value for the third set of three bits that is equal to 0.667 (at operation 130). At operation 132, the control circuitry may round the first average value to "1," may round the second average value to "0," and may round the third average value to "1," thereby recovering the original series of bits "101" identified by UE device 10 for transmission while processing operation 90 of FIG. 7. In general, larger spreading factors may help to absorb more errors in the duplicated series of bits while still allowing satellite 12 to recover the correct original series of bits than smaller spreading factors. In this way, UE devices 10 and satellite 12 may perform reverse link communications while mitigating the effects of errors in the UL data associated with relatively low transmit power levels and relatively long path lengths PL. If desired, at operation 134, the control circuitry may optionally perform forward error correction on the data payload (e.g., based on the forward error correction bits 88 in UL data packet 82). The control circuitry may subsequently pass the recovered and correct data payload up the protocol stack for further processing.

Figure 10:
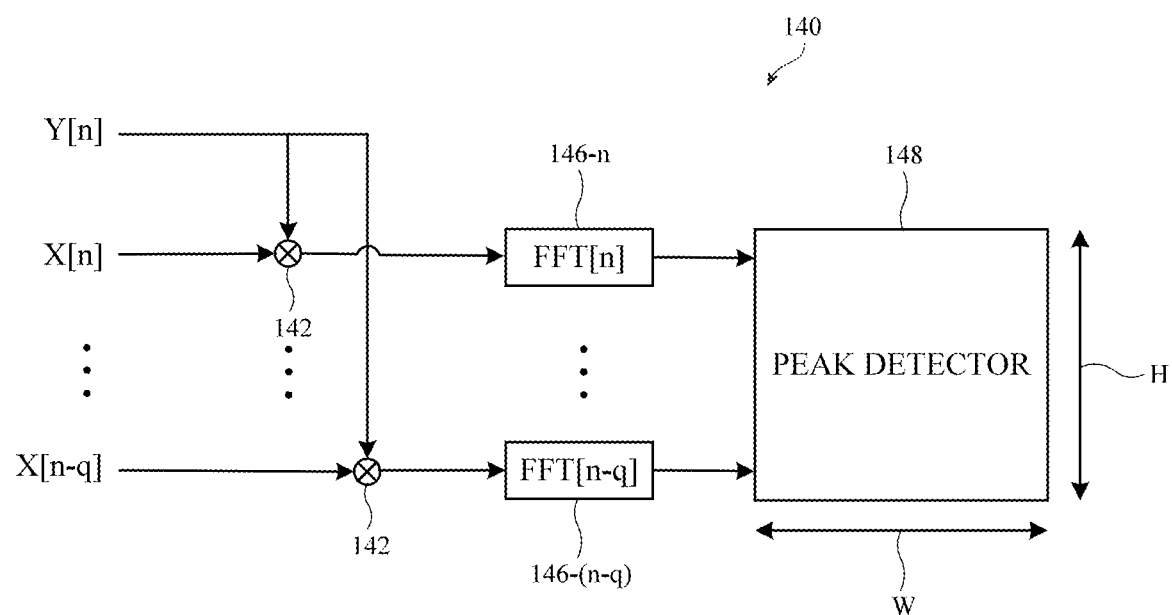
FIGS. 10 and 11 are circuit diagrams of illustrative processing logic that may process uplink signals in accordance with some embodiments.

FIG. 10 is a diagram showing one example of how control circuitry 50 on satellite 12 or control circuitry on gateway 14 may process received UL data (e.g., UL data packet 82). As shown in FIG. 10, the control circuitry may include processing logic 140 (e.g., logic implemented in hardware and/or software executed by one or more processors). Processing logic 140 may receive a stream of UL data y[n] (e.g., UL signals received at satellite 12). In an example where the sampling rate is 1.92 MHz and the sync length is 200 ms, UL data y[n] may include 384,000 samples. Processing logic 140 may also receive UE access code x[n], which is stored at and known to the processing logic (e.g., 384,000 samples of pseudorandom UE access code 84 of FIG. 6). Because the control circuitry has no a priori knowledge of where in time the actual UL data transmitted by a UE device is in the radio-frequency signals received at satellite 12, processing logic 140 may also receive a number of time-delayed versions of UE access code x[n], such as time-delayed UE access code x[n-q].

Processing logic 140 may include multipliers 142 and peak detector 148. Processing logic 142 may multiply UL data y[n] by each of the time-delayed UE access codes (e.g., time-delayed UE access code x[n-q]). This multiplication may be performed while processing operation 104 of FIG. 8, for example. Processing logic 140 may also include a set of FFTs 146-$n$ through 146-($n$-$q$). Each FFT 146 may convert the output of a respective multiplier 142 from the time domain to the frequency domain (e.g., while processing operation 106 of FIG. 8). FFTs 146 may output the frequency domain signals as a two-dimensional matrix that is provided to peak detector 148. The two-dimensional matrix may have a width W and a height H. Width W may be equal to q resource elements (e.g., the number of time-delayed UE access codes). Height H may be equal to 384,000 subcarriers. Peak detector 148 may process the two-dimensional matrix to detect signal peaks (e.g., while processing operation 108 of FIG. 8).

Figure 11:
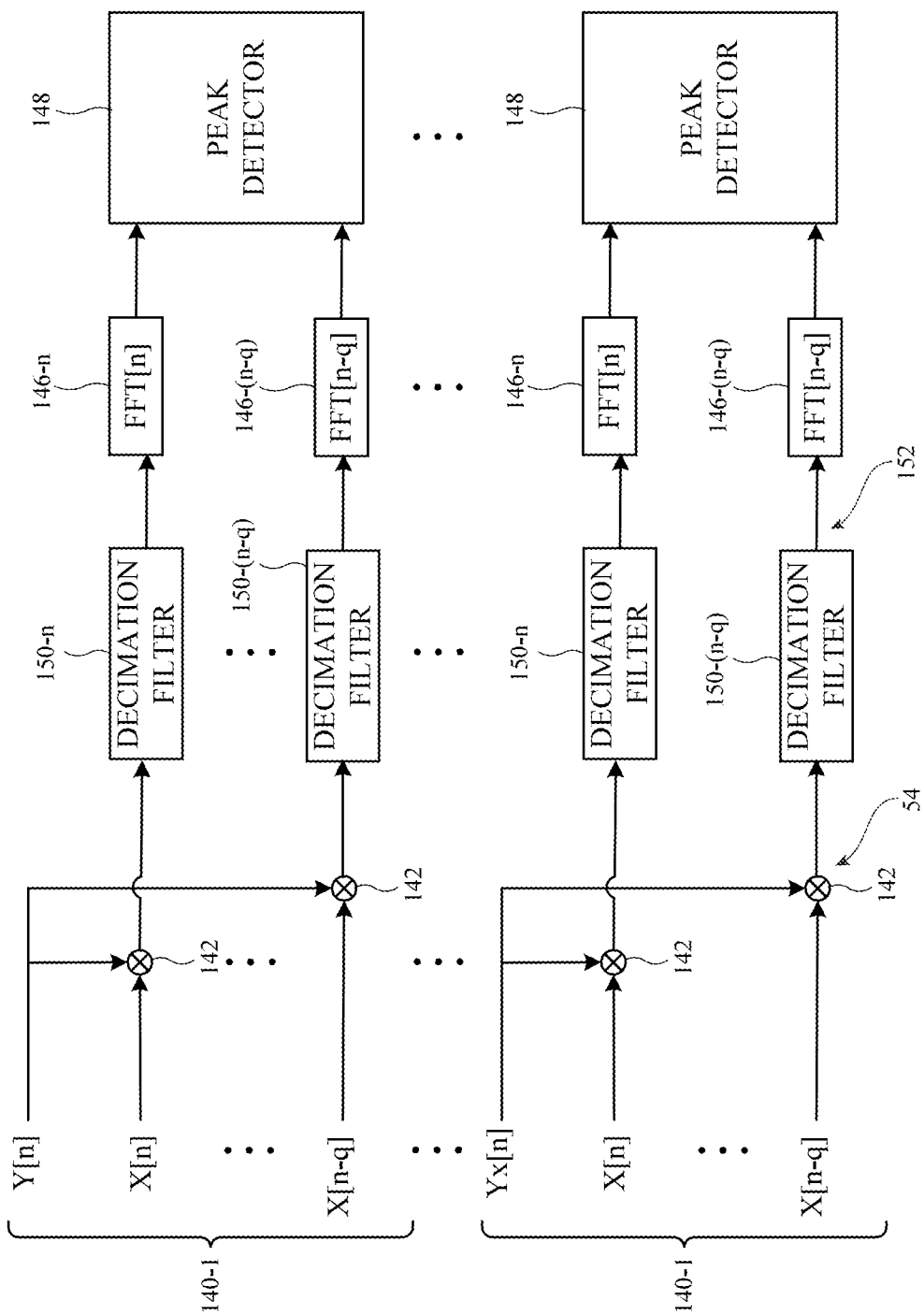

The example of FIG. 10 is merely illustrative. If desired, processing logic 140 may frequency-translate UL data y[n] across multiple frequency channels to baseband, as shown in the example of FIG. 11. As shown in FIG. 11, the control circuitry may include K chains of processing logic 140 that process K channels of UL signals concurrently (e.g., a first chain of processing logic 140-1 that processes UL data $y_1$[n] in a first channel, a Kth chain of processing logic 140-K that processes UL data $y_K$[n] in a Kth channel). Each chain of processing logic 140 may include respective multipliers 142 and FFTs 146. Each chain of processing logic 140 may also include decimation filters 150 that filter the output of multipliers 142. Each decimation filter 150 may include one or more cascaded integrator-combs (CIC) and a half-band filter, for example. Decimation filters 150 may decimate the output of multipliers 142 by a given factor (e.g., 160) to reduce the bandwidth and number of samples that are provided to FFTs 146. Decimation filters 150 may decimate the output of multipliers 142 because the UL data is at a center frequency of each channel (e.g., the UL signals do not use the full channel bandwidth). Decimation filters 150 may convert the samples to baseband. For example, when the samples output by multipliers 142 (e.g., on lines 154) are at 1.92 MHz, the output of decimation filters 150 (e.g., on lines 152) may be at 12 KHz (in an example where there is a 12 KHz sampling rate and a 200 ms sync length). In the example where there is a 12 KHz sampling rate and a 200 ms sync length, each FFT may operate on 2400 samples, rather than the 384,000 samples in the example of FIG. 10. The two dimensional matrix output by FFTs 146 to each peak detector 148 may have a width W that is equal to q resource elements and may have a height H that is equal to 2400 subcarriers in this example. This may reduce the complexity of the processing logic in the control circuitry to N*K (e.g., 384,000*4) rather than the complexity N*Log(N) (e.g., 384,000*18.5) in the example of FIG. 10.

One or more of the components of communications system 8 such as UE devices 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more aspects, at least one of the components set forth in one or more of the preceding figures may be configured to perform one or more operations, techniques, processes, or methods as set forth in the example section below. For example, the control circuitry as described above in connection with one or more of the preceding figures may be configured to operate in accordance with one or more of the examples set forth below. For another example, circuitry associated with a UE device, base station, gateway, satellite, network element, etc. as described above in connection with one or more of the preceding figures may be configured to operate in accordance with one or more of the examples set forth below in the example section.

EXAMPLES

In the following sections, further exemplary aspects are provided.

Example 1 includes a method of operating a user equipment device to communicate with a terrestrial network via a communications satellite, the method comprising: identifying a path length between the electronic device and the communications satellite; selecting a time slot from a finite time window for arrival of an uplink data packet at the communications satellite; generating a timing advance based on the selected time slot and the identified path length; and transmitting, in a satellite communications band, the uplink data packet to the communications satellite based on the timing advance.

Example 2 includes the method of example 1 or some other example or combination of examples herein, wherein identifying the path length comprises: identifying a location of the user equipment device on Earth; identifying a location of the communications satellite in space from an almanac stored at the user equipment device; and identifying the path length based on the identified location of the user equipment on Earth and the identified location of the communications satellite in space. If desired, identifying the location of the user equipment on Earth may occur solely at the user equipment, whereas a fuzzed GPS location (e.g., to allow for user privacy) is provided to the gateway through a reverse link message so the gateway may identify the beam and satellite to serve the user equipment device for the forward link messages addressed to the user.

Example 3 includes the method of example 1 or some other example or combination of examples herein, further comprising: receiving a downlink (DL) beacon from the communications satellite; and generating the timing advance based on a time reference identified by the DL beacon received from the communications satellite.

Example 4 includes the method of example 1 or some other example or combination of examples herein, wherein the finite time window has a duration between 0.1 ms and 10 ms and wherein selecting the time slot comprises randomly selecting the time slot from a plurality of time slots in the finite time window.

Example 5 includes the method of example 4 or some other example or combination of examples herein, further comprising: randomly selecting a frequency channel from a plurality of frequency channels in the satellite communications band, wherein transmitting the uplink data packet comprises transmitting the uplink data packet in the randomly selected frequency channel.

Example 6 includes the method of example 5 or some other example or combination of examples herein, further comprising: identifying a velocity of the communications satellite from an almanac stored at the user equipment device; identifying a doppler shift based on the identified velocity; and adjusting the randomly selected frequency channel to compensate for the identified doppler shift.

Example 7 includes the method of example 1 or some other example or combination of examples herein, further comprising: adjusting the timing advance to compensate for relativistic time dilation between the user equipment device and the communications satellite.

Example 8 includes the method of example 1 or some other example or combination of examples herein, further comprising: generating a data payload for the uplink data packet; and appending a pseudorandom user equipment access code to the data payload.

Example 9 includes the method of example 8 or some other example or combination of examples herein, further comprising: performing spectrum spreading operations on the data payload.

Example 10 includes the method of example 9 or some other example or combination of examples herein, further comprising: duplicating bits of the data payload by a spreading factor to produce a series of duplicated bits; and multiplying the series of duplicated bits by the pseudorandom user equipment access code.

Example 11 includes the method of example 1 or some other example or combination of examples herein, wherein the satellite communications band comprises a band selected from the group consisting of: a C band, an S band, an L band, an X band, a W band, a V band, a K band, a $K_a$ band, and a $K_u$ band.

Example 12 includes a method of operating a communications network having a communications satellite to communicate with user equipment devices on Earth, the method comprising: receiving, during a finite time window and in a satellite communications band, radio-frequency signals at the communications satellite that include time-advanced uplink signals transmitted by the user equipment devices; searching, over frequency and the finite time window, the radio-frequency signals to identify the time-advanced uplink signals transmitted by the user equipment devices; and recovering data payloads of the identified time-advanced uplink signals transmitted by the user equipment devices.

Example 13 includes the method of example 12 or some other example or combination of examples herein, further comprising: forwarding the radio-frequency signals from the communications satellite to the gateway, wherein searching the radio-frequency signals comprises searching the radio-frequency signals at the gateway.

Example 14 includes the method of example 12 or some other example or combination of examples herein, further comprising: with the communications satellite, transmitting a downlink beacon that identifies a reference time of the communications satellite prior to the finite time window.

Example 15 includes the method of example 12 or some other example or combination of examples herein, wherein the time-advanced uplink signals transmitted by the user equipment devices arrive within different respective time slots of the finite time window.

Example 16 includes the method of example 12 or some other example or combination of examples herein, wherein the finite time window has a duration between 0.5 and 10 ms.

Example 17 includes the method of example 12 or some other example or combination of examples herein, wherein searching the radio-frequency signals comprises: correlating the radio-frequency signals with a pseudorandom user equipment access code to produce correlated data; converting the correlated data from a time domain to a frequency domain to produce frequency domain correlated data; filtering the frequency domain correlated data to produce potential time-advanced uplink signals; attempting to decode the potential time-advanced uplink signals; and discarding potential time-advanced uplink signals that are unsuccessfully decoded, wherein recovering the data payloads comprises recovering the data payloads from the potential time-advanced uplink signals that are successfully decoded.

Example 18 includes the method of example 12 or some other example or combination of examples herein, wherein recovering the data payloads comprises: multiplying bits from one of the identified time-advanced uplink signals by a pseudorandom user access code to recover duplicated bits; averaging the duplicated bits based on a spreading factor to produce average values; and rounding the average values to the closer of 1 or 0.

Example 19 includes a non-transitory computer-readable storage medium storing one or more programs configured to be executed by at least one processor on an electronic device, the one or more programs including instructions that, when executed by the at least one processor, cause the at least one processor to: receive, using a radio, a downlink (DL) beacon transmitted by a communications satellite; randomly select a time slot within a finite time window associated with a reference time identified by the DL beacon; identify a path length between the electronic device and the communications satellite based on a location of the electronic device and communications satellite position information stored on the electronic device; generate a timing advance based on the identified path length, the reference time, and the randomly selected time slot; and transmit, using the radio, an uplink (UL) data packet according to the timing advance Example 20 includes the non-transitory computer-readable storage medium of example 19 or some other example or combination of examples herein, wherein the one or more programs include instructions that, when executed by the at least one processor, cause the at least one processor to: generate the UL data packet having a data payload and a pseudorandom user equipment access code appended to the data payload; duplicate bits in the data payload by a spreading factor to produce a series of duplicated bits; and multiply the series of duplicated bits by the pseudorandom user equipment access code.

Example 21 may include an apparatus comprising means to perform one or more elements of a method described in or related to any of examples 1-20 or any combination thereof, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20 or any combination thereof, or any other method or process described herein.

Example 23 may include an apparatus comprising logic, modules, or circuitry to perform one or more elements of a method described in or related to any of examples 1-20 or any combination thereof, or any other method or process described herein.

Example 24 may include a method, technique, or process as described in or related to any of examples 1-20 or any combination thereof, or portions or parts thereof.

Example 25 may include an apparatus comprising: one or more processors and one or more non-transitory computer-readable storage media comprising instructions that, when executed by the one or more processors, cause the one or more processors to perform the method, techniques, or process as described in or related to any of examples 1-20, or any combination thereof, or portions thereof.

Example 26 may include a signal as described in or related to any of examples 1-20, or any combination thereof, or portions or parts thereof.

Example 27 may include a datagram, information element, packet, frame, segment, PDU, or message as described in or related to any of examples 1-20, or any combination thereof, or portions or parts thereof, or otherwise described in the present disclosure.

Example 28 may include a signal encoded with data as described in or related to any of examples 1-20, or any combination thereof, or portions or parts thereof, or otherwise described in the present disclosure.

Example 29 may include a signal encoded with a datagram, IE, packet, frame, segment, PDU, or message as described in or related to any of examples 1-20, or any combination thereof, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or any combination thereof, or portions thereof.

Example 31 may include a computer program comprising instructions, wherein execution of the program by a processing element is to cause the processing element to carry out the method, techniques, or process as described in or related to any of examples 1-20, or any combination thereof, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description but is not intended to be exhaustive or to limit the scope of aspects to the precise form disclosed.

The foregoing is merely illustrative and various modifications can be made to the described embodiments. The foregoing embodiments may be implemented individually or in any combination.

What is claimed is:

1. A method of operating a user equipment device to communicate with a terrestrial network via a communications satellite, the method comprising:
   identifying a path length between the electronic device and the communications satellite;
   selecting a time slot from a finite time window for arrival of an uplink data packet at the communications satellite, wherein the uplink data packet comprises a data payload;
   multiplying bits of the data payload by a user equipment access code;
   appending the user equipment access code to the data payload;
   generating a timing advance based on the selected time slot and the identified path length; and
   transmitting, in a satellite communications band, the uplink data packet to the communications satellite based on the timing advance.

2. The method of claim 1, wherein identifying the path length comprises:
   identifying a location of the user equipment device on Earth;
   identifying a location of the communications satellite in space from an almanac stored at the user equipment device; and
   identifying the path length based on the identified location of the user equipment on Earth and the identified location of the communications satellite in space.

3. The method of claim 1 further comprising:
   receiving a downlink (DL) beacon from the communications satellite; and
   generating the timing advance based on a time reference identified by the DL beacon received from the communications satellite.

4. The method of claim 1 wherein the finite time window has a duration between 0.1 ms and 10 ms and wherein selecting the time slot comprises randomly selecting the time slot from a plurality of time slots in the finite time window, further comprising:
   randomly selecting a frequency channel from a plurality of frequency channels in the satellite communications band, wherein transmitting the uplink data packet comprises transmitting the uplink data packet in the randomly selected frequency channel;
   identifying a velocity of the communications satellite from an almanac stored at the user equipment device;
   identifying a doppler shift based on the identified velocity; and
   adjusting the randomly selected frequency channel to compensate for the identified doppler shift.

5. The method of claim 1, wherein the user equipment access code comprises a pseudorandom user equipment access code, the method further comprising:
   duplicating bits of the data payload by a spreading factor to produce a series of duplicated bits, wherein multiplying the bits of the data payload by the user equipment access code comprises multiplying the series of duplicated bits by the pseudorandom user equipment access code.

6. The method of claim 1, wherein the multiplied bits of the data payload correspond to bits of the data payload that are duplicated by a spreading factor.

7. The method of claim 1, wherein the satellite communications band comprises a band selected from the group consisting of:

a C band, an S band, an L band, an X band, a W band, a V band, a K band, a $K_a$ band, and a $K_u$ band.

8. A method of operating a user equipment device to communicate with a terrestrial network via a communications satellite, the method comprising:
identifying a path length between the electronic device and the communications satellite;
selecting a time slot from a finite time window for arrival of an uplink data packet at the communications satellite, wherein the uplink data packet comprises a data payload;
multiplying bits of the data payload by a user equipment access code;
generating a timing advance based on the selected time slot and the identified path length;
transmitting, in a satellite communications band, the uplink data packet to the communications satellite based on the timing advance; and
adjusting the timing advance to compensate for relativistic time dilation between the user equipment device and the communications satellite.

9. The method of claim 8, further comprising:
appending the user equipment access code to the data payload.

10. The method of claim 8, further comprising:
receiving a downlink (DL) beacon from the communications satellite; and
generating the timing advance based on a time reference identified by the DL beacon received from the communications satellite.

11. The method of claim 8, wherein the multiplied bits of the data payload correspond to bits of the data payload that are duplicated by a spreading factor.

12. The method of claim 8, wherein the user equipment access code comprises a pseudorandom user equipment access code.

13. A method of operating a communications network having a communications satellite to communicate with user equipment devices on Earth, the method comprising:
receiving, during a finite time window and in a satellite communications band, radio-frequency signals at the communications satellite that include time-advanced uplink signals transmitted by the user equipment devices;
searching, over frequency and the finite time window, the radio-frequency signals to identify the time-advanced uplink signals transmitted by the user equipment devices, wherein searching the radio-frequency signals comprises correlating the radio-frequency signals with a user equipment access code; and
recovering data payloads of the identified time-advanced uplink signals transmitted by the user equipment devices, wherein recovering the data payloads comprises multiplying bits from one of the identified time-advanced uplink signals by the user equipment access code to recover duplicated bits.

14. The method of claim 13, further comprising:
forwarding the radio-frequency signals from the communications satellite to the gateway, wherein searching the radio-frequency signals comprises searching the radio-frequency signals at the gateway.

15. The method of claim 13, further comprising:
with the communications satellite, transmitting a downlink beacon that identifies a reference time of the communications satellite prior to the finite time window.

16. The method of claim 13, wherein the time-advanced uplink signals transmitted by the user equipment devices arrive within different respective time slots of the finite time window.

17. The method of claim 13, wherein the finite time window has a duration between 0.5 and 10.0 ms.

18. The method of claim 13, wherein correlating the radio-frequency signals produces correlated data and searching the radio-frequency signals further comprises:
converting the correlated data from a time domain to a frequency domain to produce frequency domain correlated data;
filtering the frequency domain correlated data to produce potential time-advanced uplink signals;
attempting to decode the potential time-advanced uplink signals; and
discarding potential time-advanced uplink signals that are unsuccessfully decoded, wherein recovering the data payloads comprises recovering the data payloads from the potential time-advanced uplink signals that are successfully decoded.

19. The method of claim 13, wherein recovering the data payloads comprises:
averaging the duplicated bits based on a spreading factor to produce average values; and
rounding the average values to the closer of 1 or 0.

20. The method of claim 13, wherein recovering the data payloads further comprises:
averaging the duplicated bits based on a spreading factor to produce average values.

* * * * *